United States Patent
Ogawa

(10) Patent No.: US 7,301,877 B2
(45) Date of Patent: Nov. 27, 2007

(54) REPRODUCED SIGNAL EVALUATION METHOD, INFORMATION RECORDING MEDIUM, INFORMATION REPRODUCING APPARATUS, INFORMATION REPRODUCING METHOD, AND INFORMATION RECORDING METHOD

(75) Inventor: Akihito Ogawa, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 18 days.

(21) Appl. No.: 11/455,676

(22) Filed: Jun. 20, 2006

(65) Prior Publication Data

US 2006/0233085 A1    Oct. 19, 2006

Related U.S. Application Data

(62) Division of application No. 10/447,941, filed on May 30, 2003, now Pat. No. 7,158,462.

(30) Foreign Application Priority Data

Jun. 5, 2002   (JP)   ............................. 2002-164770
Mar. 12, 2003  (JP)   ............................. 2003-066998

(51) Int. Cl.
   *G11B 7/005*   (2006.01)
(52) U.S. Cl. .................................................. 369/59.23
(58) Field of Classification Search .................... None
   See application file for complete search history.

(56) References Cited

U.S. PATENT DOCUMENTS

| 6,529,459 B1 | 3/2003 | Lebowsky |
| 6,785,210 B2 | 8/2004 | Noda et al. |
| 2005/0147007 A1 | 7/2005 | Nakano et al. |

FOREIGN PATENT DOCUMENTS

| CN | 1135637 A | 11/1996 |
| JP | 2000-36115 | 2/2000 |
| JP | 2001-291325 | 10/2001 |
| JP | 2003-157534 | 5/2003 |
| JP | 2003-187446 | 7/2003 |

*Primary Examiner*—William R. Korzuch
*Assistant Examiner*—Joseph R. Haley
(74) *Attorney, Agent, or Firm*—Pillsbury Winthrop Shaw Pittman, LLP

(57) ABSTRACT

This invention relates to a reproduced signal evaluation method of evaluating a reproduced signal reproduced from an information recording medium in which information composed of a plurality of codes differing in length is recorded and evaluates the reproduced signal on the basis of the reproduced signal of the next shortest code after the shortest code reproduced from the information recording medium.

4 Claims, 17 Drawing Sheets

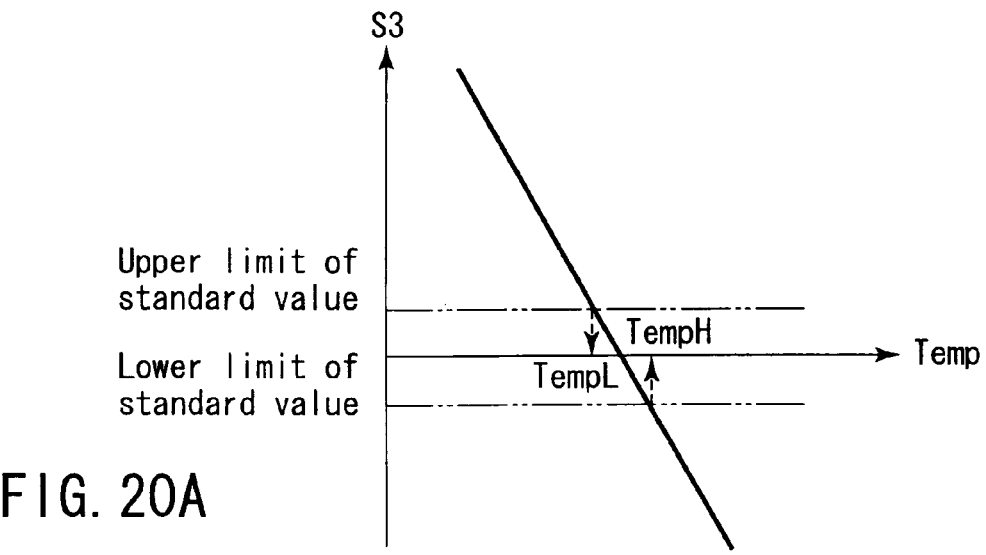
FIG. 20A
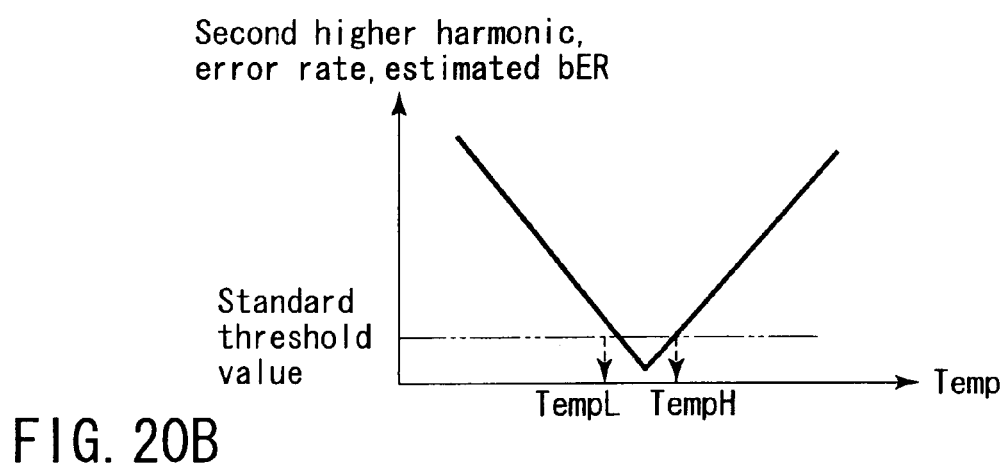
FIG. 20B
| Tsfp | Mark | | | |
|---|---|---|---|---|
| | 2T | 3T | 4T | >4T |
| Preceding space 2T | | | | |
| 3T | | | | |
| 4T | | | | |
| >4T | | | | |
FIG. 21A
| Telp | Mark | | | |
|---|---|---|---|---|
| | 2T | 3T | 4T | >4T |
| Following space 2T | | | | |
| 3T | | | | |
| 4T | | | | |
| 4T> | | | | |
FIG. 21B

REPRODUCED SIGNAL EVALUATION METHOD, INFORMATION RECORDING MEDIUM, INFORMATION REPRODUCING APPARATUS, INFORMATION REPRODUCING METHOD, AND INFORMATION RECORDING METHOD

CROSS-REFERENCE TO RELATED APPLICATIONS

This is a divisional of U.S. patent application Ser. No. 10/447,941, filed on May 30, 2003, now U.S. Pat No. 7,158,462 which claims priority upon Japanese Patent Application Nos. 2002-164770, filed Jun. 5, 2002 and 2003-066998, filed Mar. 12, 2003, the contents of all of which are incorporated herein by reference in their entireties.

BACKGROUND OF THE INVENTION

1. Field of the Invention

This invention relates to an information recording medium, such as an optical disk capable of recording and reproducing information, a method of evaluating the reproduced signal from the information recording medium, a method of reproducing the information from the information recording medium, a method of recording information on the information recording medium, and an information reproducing apparatus.

2. Description of the Related Art

One known recordable or rewritable information recording medium is an electrothermal recording medium. This recording medium allows information to be recorded by heating and cooling an information recording medium. A typical electrothermal recording medium is a phase change medium. The phase change medium records information by making use of the difference between the phases of the medium, that is, the difference in physical properties between the amorphous and crystal line phases, such as the difference in reflectivity. For example, in an optical disk apparatus using a phase change medium, all the surface of a medium is crystallized in a prior initialization and laser light of high intensity is projected onto the medium in pulse form, thereby forming amorphous recording marks.

This is because the strong laser light melts the medium and then the medium cools rapidly and becomes amorphous, when the projection of the laser light becomes weak. On the other hand, when the information is reproduced, a weak laser light of a specific level is projected onto the medium and a change in the reflectivity caused by the amorphous sections acting as the recording marks and the crystal sections is converted into an electric signal, thereby reading the information.

An optical disk using a phase change medium recently put to practical use is a DVD-RAM (ISO/IEC16824). In the DVD-RAM, information is recorded and erased by changing the output level of laser light to be projected. The information is recorded on recording tracks of the optical disk in the form of a plurality of recording marks. The individual recording marks are formed by projecting a plurality of laser pulses onto the recording tracks. The recording waveform of the laser pulse is generally called write strategy. Write strategy, which shows a laser modulation method or a recording waveform in recording a mark on an optical disk, is defined for each length of a recording mark.

In a DVD-RAM write strategy, the optical output has three or four levels. Specifically, they are a peak power for heating a medium over the melting temperature, bias power 1 (erasing power) for holding the medium at the crystallizing temperature for the crystallization retention time, and bias power 2 and bias power 3 for cooling the melted medium rapidly to make it amorphous. In the DVD-RAM, the optical output levels are adjusted, thereby adjusting accurately the size and shape of a mark to be recorded.

In the DVD-RAM, the optical output levels defined in the write strategy are constant, regardless of the width of the mark and that of the space (no signal). Therefore, unlike a recording mark sandwiched between long spaces, a recording mark sandwiched between short spaces receives the quantity of heat for recording the preceding and following marks, which causes a thermal interference problem: the quantity of heat causes the recording mark to recrystallize or the melted portion to expand. In the DVD-RAM, to avoid this problem, the pulse width is made wider or narrower by adjusting the widths of the preceding and following spaces, thereby correcting a variation in the width of the mark and obtaining the desired shape of the mark.

On the other hand, in a method of evaluating the recorded signal (marks/spaces), asymmetry has been defined in the DVD-RAM. The asymmetry defined in the DVD-RAM is used to evaluate the difference between the reproduced waveform center level of the densest pattern of the recorded data and the reproduced waveform center level of the least dense pattern of the recorded data.

As described above, in the DVD-RAM, the write strategy is adjusted, thereby coping with a change in the recording mark area caused by thermal interference. The procedure and method for the adjustment has been disclosed in, for example, Jpn. Pat. Appln. KOKAI Publication No. 2000-36115. In this publication, a test pattern is recorded before actual user data is recorded and the write strategy (pulse width) is adjusted. In this case, the densest pattern and the least dense pattern in the used modulation method are used as test patterns and the pulse width is adjusted so that the difference between the center levels of the reproduced signals may become zero.

As for an evaluation index of the reproduced signal in the DVD-RAM, the difference between the center level of the densest pattern and the center level of the least dense pattern is defined as asymmetry. Making the asymmetry below the standard value keeps the balance of the densest signal in the direction of amplitude with respect to the envelope of the reproduced signal, which enhances the reproducing characteristic and interchangeability of the information recording medium. When information is recorded with higher density, however, the effect of thermal interference becomes greater, which may result in a serious loss of the balance of not only the densest pattern but also other patterns in the direction of amplitude. In such a case, reproduction of the information becomes difficult and the interchangeability of the information recording medium is also lost.

Furthermore, in the DVD-RAM, although asymmetry has been defined, the procedure for adjusting the write strategy to optimize the asymmetry has not been disclosed.

In addition, jitter in the random data including the densest pattern is used as an index for determining the write strategy. However, when the recording of information gets much denser and an identification method different from a conventional slice method, such as partial response maximum likelihood (PRML), is used as the reproduced-signal processing method, it becomes difficult to measure jitter in the signal including the densest pattern. This causes the following problem: the write strategy using the jitter as an index can be determined.

Moreover, as a method of adjusting the write strategy by using asymmetry, Jpn. Pat. Appln. KOKAI Publication No. 2000-36115 has disclosed a method of recording test data about a combined pattern of the densest and least dense codes and adjusting the write strategy, particularly the pulse width, in such a manner that the center levels of the reproduced signals are aligned. However, this method cannot cope with a thermal interference problem resulting from the recording of information with higher density. Furthermore, in the correction method, the pulse width is corrected in all cases. In high-density recording affected greatly by thermal interference, the following problem arises: use of only such a correction makes it difficult to form recording marks with high accuracy and adjust the asymmetry.

BRIEF SUMMARY OF THE INVENTION

A reproduced signal evaluation method according to an aspect of the present invention is a reproduced signal evaluation method of evaluating a reproduced signal reproduced from an information recording medium in which information composed of a plurality of codes differing in length is recorded, the reproduced signal evaluation method comprising evaluating the reproduced signal on the basis of the reproduced signal of the next shortest code after the shortest code reproduced from the information recording medium.

An information recording medium according to an aspect of the present invention is an information recording medium for recording information composed of a plurality of codes differing in length, wherein the result of evaluating a reproduced signal on the basis of the reproduced signal of the next shortest code after the shortest code reproduced from the information recording medium satisfies a specific evaluation level.

An information reproducing apparatus according to an aspect of the present invention is an information reproducing apparatus for reproducing information from an information recording medium in which information composed of a plurality of codes differing in length is recorded and in which, if the maximum value of the reproduced signal of the shortest code reproduced from the information recording medium is IaH and the minimum value of the reproduced signal is IaL, the maximum value of the reproduced signal of the next shortest code after the shortest code reproduced from the information recording medium is IbH and the minimum value of the reproduced signal is IbL, and the amplitude of the reproduced signal of a code three times or more as long as the longest code or the shortest code reproduced from the information recording medium is Ic, the value of $\{(IbH+IbL)/2-(IaH+IaL)/2\}/Ic \times 100$ is equal to or more than $-4$ and equal to or less than $4$, the information reproducing apparatus comprising: sensing means for sensing the reflected light of a light beam projected onto the information recording area; and reproducing means for reproducing information composed of a plurality of code differing in length on the basis of the reflected light sensed by the sensing means.

An information reproducing method according to an aspect of the present invention is an information reproducing method of reproducing information from an information recording medium in which information composed of a plurality of codes differing in length is recorded and in which, if the maximum value of the reproduced signal of the shortest code reproduced from the information recording medium is IaH and the minimum value of the reproduced signal is IaL, the maximum value of the reproduced signal of the next shortest code after the shortest code reproduced from the information recording area is IbH and the minimum value of the reproduced signal is IbL, and the amplitude of the reproduced signal of a code three times or more as long as the longest code or the shortest code reproduced from the information recording area is Ic, the value of $\{(IbH+IbL)/2-(IaH+IaL)/2\}/Ic \times 100$ is equal to or more than $-4$ and equal to or less than $4$, the information reproducing apparatus comprising: sensing the reflected light of a light beam projected onto the information recording area; and reproducing information composed of a plurality of code differing in length on the basis of the sensed reflected light.

An information recording method according to an aspect of the present invention is an information recording method of recording information into an information recording medium, comprising recording information by projecting a light beam in such a manner that, as a result of recording information composed of a plurality of codes differing in length into the information recording medium, if the maximum value of the reproduced signal of the shortest code reproduced from the information recording medium is IaH and the minimum value of the reproduced signal is IaL, the maximum value of the reproduced signal of the next shortest code after the shortest code reproduced from the information recording medium is IbH and the minimum value of the reproduced signal is IbL, and the amplitude of the reproduced signal of a code three times or more as long as the longest code or the shortest code reproduced from the information recording medium is Ic, the value of $\{(IbH+IbL)/2-(IaH+IaL)/2\}/Ic \times 100$ is equal to or more than $-4$ and equal to or less than $4$.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIGS. 20A and 20B show states of changes in the setting value and evaluation index of time Temp1;

FIGS. 21A and 21B show compensation tables for setting the values of times Tsfp, Telp for a mark to be recorded so as to correspond to the preceding space or the following space;

DETAILED DESCRIPTION OF THE INVENTION

Referring to the accompanying drawings, embodiments of the present invention will be explained in detail. The embodiments explained below are illustrative and not restrictive.

Figure 1:
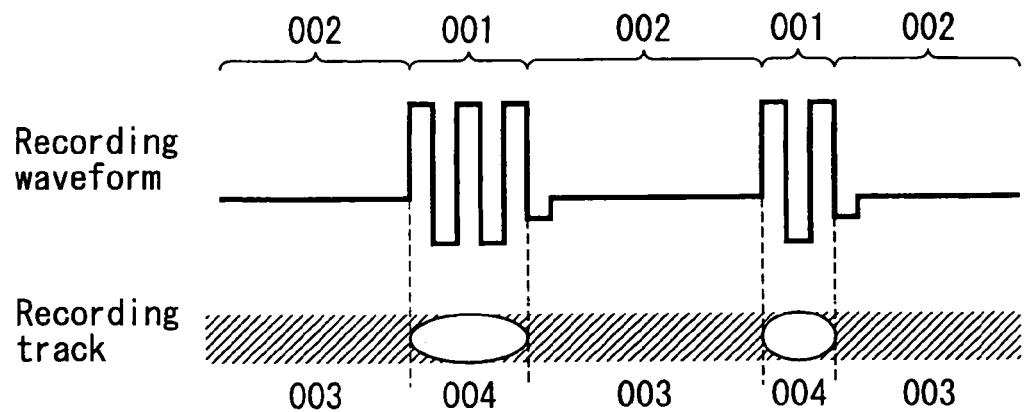
FIG. 1 schematically shows a recording waveform of laser light and a track on which information is recorded in the form of marks.

FIG. 1 schematically shows a recording waveform of laser light and a track on which information is recorded in an information recording apparatus according to an embodiment of the present invention. The recording waveform is roughly divided into recording portions 001 and erasing portions 002. Suppose the recording medium is a phase change medium. The recording film is heated by a plurality of heating pulses and then cooled rapidly, thereby forming amorphous marks 004 on a recording track. Ideally, the leading edge position of a recorded mark 004 is determined by the rising position of a heating pulse. Similarly, the trailing edge position of the recorded mark 004 is determined by the falling position of the heating pulse.

Accordingly, to move back the leading edge position of the recorded mark (to the right in the figure), the rising position of the heating pulse has only to be shifted back. On a recording portion 001, a plurality of heating pulses are projected. Changing the width of each pulse makes it possible to control the shape of the mark, including the lateral width of the recorded mark. In an erasing portion 002, the recording light is kept at a constant level. As a result, the recording medium is kept at the crystallization temperature and then crystallized. The crystallized portion 003 between a recorded mark 004 and another recorded mark 004 is called a space.

Figure 2A:
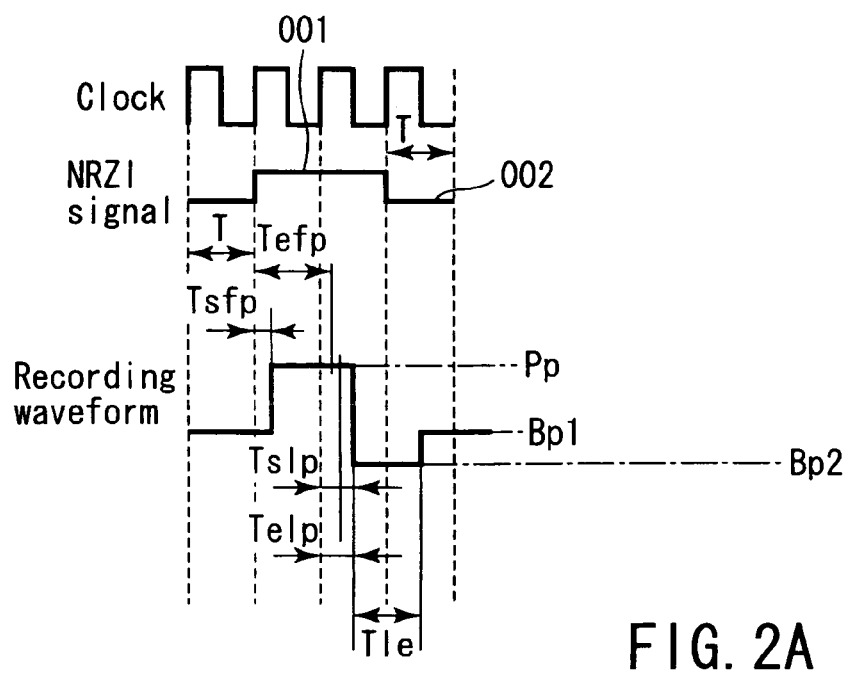
FIGS. 2A and 2B are diagrams to help explain a write strategy showing the correspondence between an NRZI signal waveform representing information and a recording waveform.
Figure 2B:
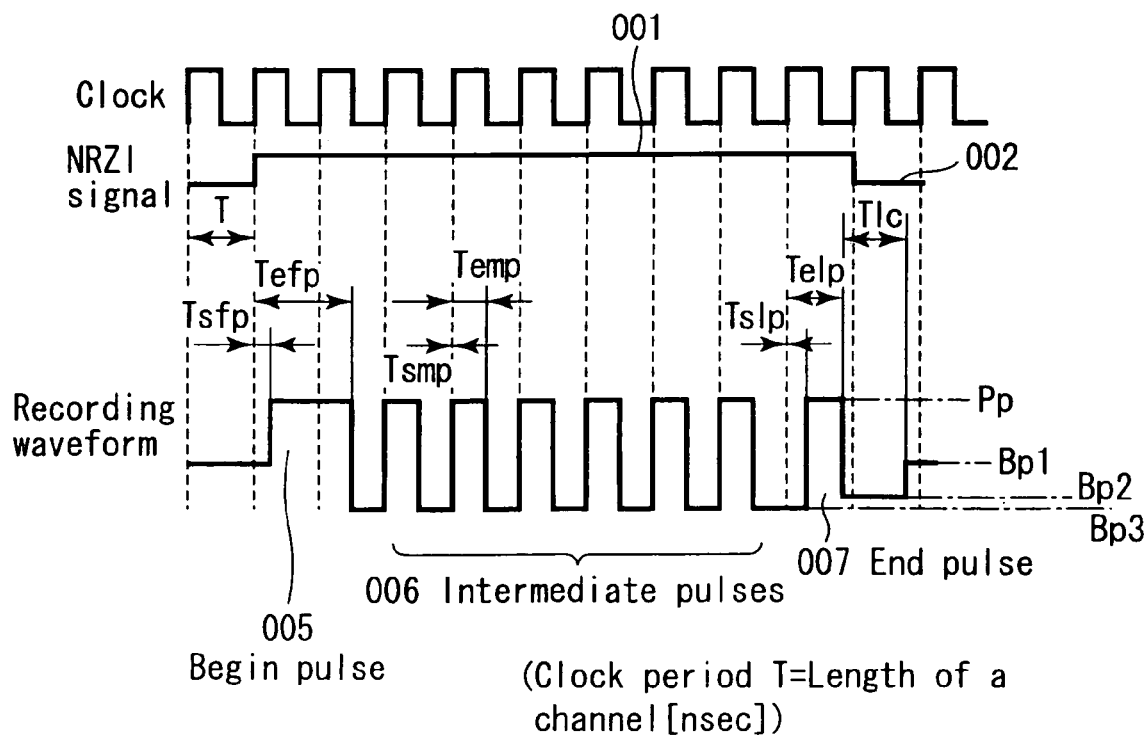

FIGS. 2A and 2B show an example of a write strategy representing the correspondence between a recording waveform and a recording signal. If the period of a reference clock is T, FIG. 2A shows a recording waveform for recording a 2T mark and FIG. 2B shows a recording waveform for recording a 9T mark. In the erasing portion 002, the power of the recording light is kept at Bp1. In the recording portion 001, the power of the recording light rises to Pp. Thereafter, for cooling, the power of the recording light drops to erasing power Bp2 or erasing power Bp3. In the recording portion 001, the individual pulses are divided into a begin pulse 005, intermediate pulses 006, and an end pulse 007 by their functions. The width of each pulse is defined by the following variables with respect to the rising of the NRZI signal or the rising position of the reference clock: delay times Tsfp, Tefp, Tsmp, Temp, Tslp, Telp, and Tlc. The number of intermediate pulses is determined by the length of a code to be recorded.

Tsfp: The begin pulse start time with respect to the rising of the NRZI signal

Tefp: The begin pulse end time with respect to the rising of the NRZI signal

Tsmp: The intermediate pulse start time with respect to the reference clock

Temp: The pulse width of each intermediate pulse

Tslp: The last pulse start time with respect to the reference clock

Telp: The last pulse end time with respect to the reference clock

Tlc: the time during which erasing power Bp2 is supplied after the last pulse

Next, a method of evaluating the reproduced signal will be explained.

Figure 3:
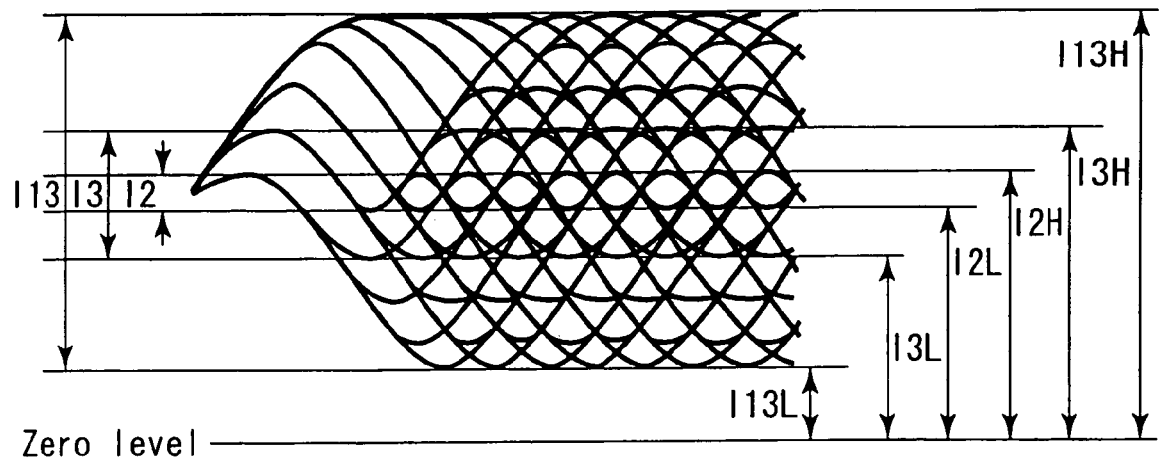
FIG. 3 shows waveforms of the reproduced signals of the user data recorded using the write strategy, that is, an eye-pattern.

FIG. 3 shows waveforms of the reproduced signals of the user data (random data) recorded using the write strategy, that is, an eye-pattern. Suppose the shortest code (the length of a mark or space) used in modulating the data is 2T and the longest code is 13T. A signal with the smallest amplitude in the eye-pattern is a reproduced signal with a 2T mark and a 2T space. Hereinafter, a continuous signal with a 2T mark and a 2T space is referred to as a 2T pattern. The highest level of the reproduced signal of a 2T pattern is defined as I2H and the lowest level is defined as I2L. A signal with the next smaller amplitude is a reproduced signal with a 3T mark and a 3T space. For the reproduced signal of a 3T pattern, I3H and I3L are defined similarly with a 2T pattern. The amplitude of the 3T pattern is defined as I3. A signal with the largest amplitude is a reproduced signal with a 13T mark and a 13T space. For the reproduced signal of a 13T pattern, I13H and I13L are defined similarly with a 2T pattern. The amplitude of the 13T pattern is defined as I13.

Here, the definition of two symmetries serving as evaluation indexes of a reproduced signal in the embodiment will be explained. A first asymmetry or asymmetry 1: AS2T13T is the asymmetry of a 2T pattern for an envelope waveform of all of the random data and is defined as follows:

$$AS2T13T=\{(I13H+I13L)/2-(I2H+I2L)/2\}/I13\times100\% \quad (1)$$

A second symmetry or symmetry 2: AS2T3T is the asymmetry of a 3T pattern and a 2T pattern liable to be identified erroneously and is defined as follows:

$$AS2T3T=\{(I3H+I3L)/2-(I2H+I2L)/2\}/I3\times100\% \quad (2)$$

Here, (I13H+I13L)/2 is the center level of I13, (I3H+I3L)/2 is the center level of I3, and (I2H+I2L)/2 is the center level of I2.

A third asymmetry or asymmetry 3: AS3T13T is the asymmetry of a 3T pattern for an envelope waveform of a 13T pattern and is defined as follows:

$$AS3T13T=\{(I13H+I13L)/2-(I3H+I3L)/2\}/I13\times100\% \quad (3)$$

The asymmetry defined in equation (1) has been used before.

In contrast, the asymmetry expressed by equation (2) and that expressed by equation (3) are newly defined in the embodiment. The asymmetry 2 defined by equation (2) can be used to evaluate the difference in signal level between the shortest code liable to identification errors and the next shortest code, for example, 2T code and 3T code, in the codes used in a modulation law. The modulation law is a law applied to a case where, when information is recorded on an optical disk, the information is modulated into a signal with a signal width as large as an integral multiple of T as shown in FIGS. 2A and 2B, for example, 2T or more. For example, in a conventional DVD-ROM, 8-16 modulation is used as the modulation law.

The fact that the asymmetry 2 is close to zero means that the reproduced signals of a 2T code and a 3T code are ideally related in the direction of amplitude. If the asymmetry 2 is close to zero, the identification error rate becomes lower in an optical disk on which data has been recorded with high density. Particularly in an optical disk using an identification method using a plurality of identification threshold values in the amplitude direction, such as PRML, the effect of the ideal relationship is great. In addition, a medium on which a signal with the asymmetry 2 close to zero has been recorded becomes a highly interchangeable medium, because the signal is close to the ideal state.

The asymmetry 3 defined in equation (3) can be used to evaluate the difference in signal level between the longest code and the next shortest code in the codes used in the modulation law, for example, a 13T code and a 3T code. In an optical disk on which data is recorded with high density, a signal of the 2T code, the densest code, has a very small amplitude and may be hard to measure. In contrast, the amplitude of the 3T code is sufficiently smaller than that of the 13T and larger than that of the 2T code. Thus, when the asymmetry 3 is used to evaluate a signal, it is relatively easy to produce almost the same effect as that of the asymmetry 1, the definition of conventional asymmetry. The least dense code used in measuring the asymmetry 1, asymmetry 2, and asymmetry 3 is not limited to the 13T code. For instance, an 8T or higher code may be used.

The result of measuring the relationship between the asymmetries defined as described above and the error rates of the reproduced signals will be explained.

Figure 4:
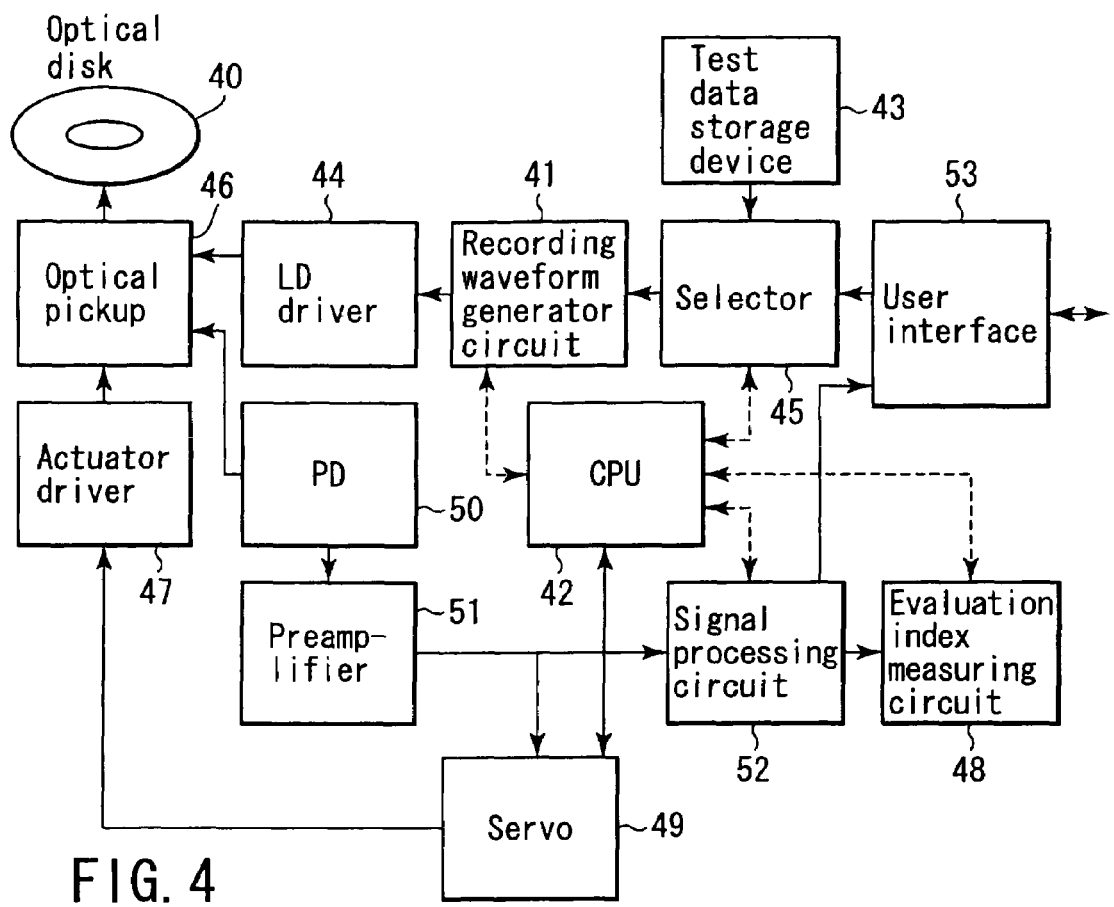
FIG. 4 shows an embodiment of an optical disk apparatus according to one embodiment of the present invention.

FIG. 4 shows an embodiment of an optical disk apparatus used for measurement in the present invention. Under the control of a CPU 42, an optical pickup 46 causes a servo circuit 49 and an actuator driver 47 to perform focusing and tracking with a weak laser-light-emitting power for data reproduction, thereby generating a light beam stop on a recording track of an optical disk 40.

The optical disk apparatus uses the PRML identification method in the signal processing at a signal processing circuit 52. An evaluation index measuring circuit 48 can measure not only asymmetry 1, asymmetry 2, asymmetry 3 but also the second higher harmonic, erasing ratio, carrier-to-noise (C/N), modulation factor, error rate, estimated error rate, S1, S2, S3, and other factors explained later. The CPU 42 has the function of determining a write strategy from the value of the measured evaluation index according to the procedure for determining a write strategy explained below and setting a recording waveform generator circuit 41. In a test data storage device 43, test data as shown in FIGS. 14, 15, 17A, and 19A explained later can be stored. When the CPU 42 switches a selector 45 to the test data storage device 43, the test data is input to the recording waveform generator circuit 41. The recording waveform generator circuit 41 outputs the recording signal of the waveform corresponding to the set write strategy. The recording signal is amplified by an LD driver 44 and drives a laser diode (not shown) provided in the optical pickup 46, with the result that a mark is recorded on the optical disk. The selector 45 is generally connected to a user interface 53, which allows the input user data to be recorded on the optical disk.

Figure 5:
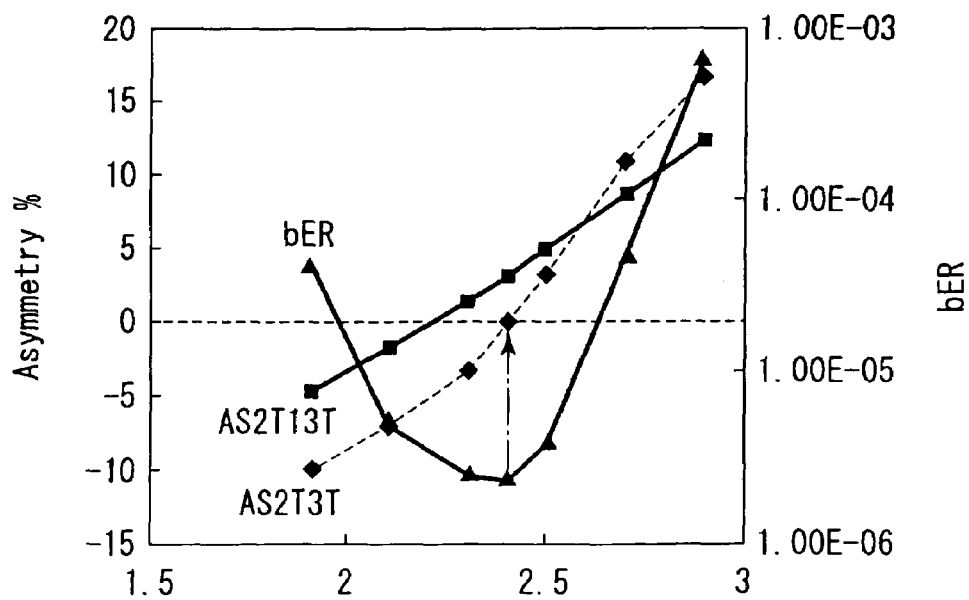
FIG. 5 shows the results of measuring asymmetry 1, asymmetry 2, and the error rate (bER) of a reproduced signal when erasing power Bp1 is changed.

FIG. 5 shows the results of measuring asymmetry 1, asymmetry 2, and the error rate (bER) of a reproduced signal when the erasing power Bp1 is changed. At this time, all of the variables excluding the erasing power Bp1 in the write strategy in FIGS. 2A and 2B are fixed. Thus, changing the erasing power Bp1 is equivalent to changing the Pp/Bp ratio, the ratio of the recording power Pp to the erasing power Bp1. It is seen from the results of the measurements that, as the erasing power Bp1 is increased, asymmetry 1 and asymmetry 2 change in the positive direction. It is also seen that the error rate of the reproduced signal is best when Bp1=2.4 mW. At this time, asymmetry 2 is almost zero, whereas asymmetry 1 is at about 3%. Thus, it can be said that asymmetry 2 is an evaluation index more sensitive to the error rate of the reproduced signal than asymmetry 1.

Figure 6:
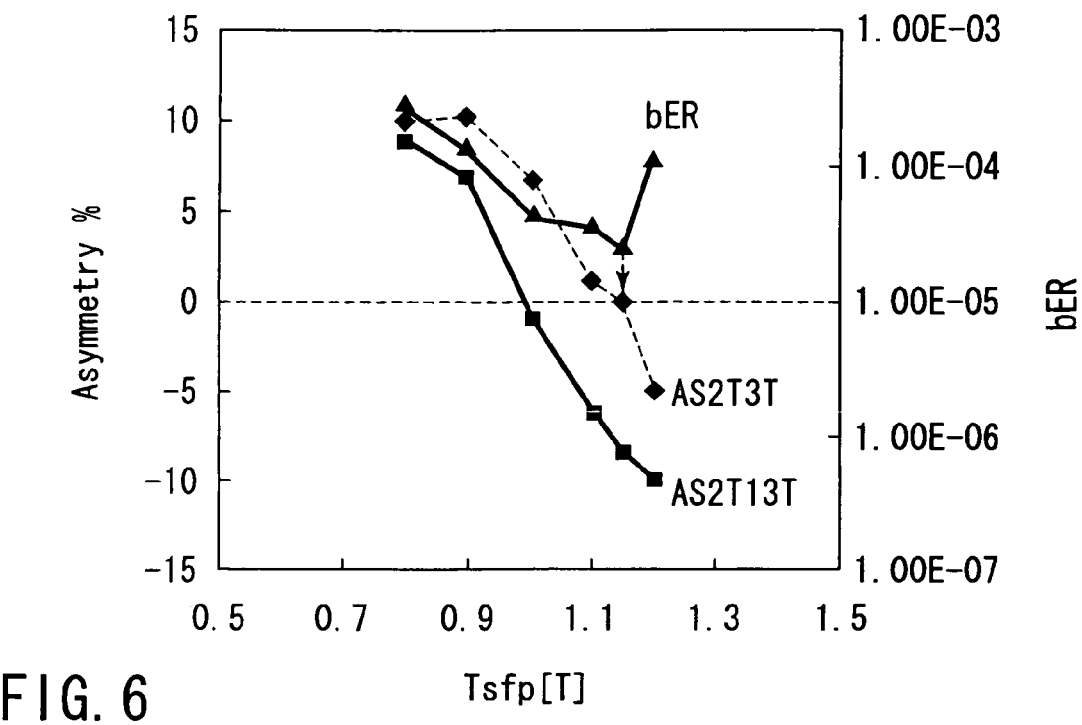
FIG. 6 shows the results of measuring asymmetry 1, asymmetry 2, and the error rate (bER) of a reproduced signal when time Tsfp is changed.

FIG. 6 shows the results of measuring asymmetry 1, asymmetry 2, and the error rate (bER) of a reproduced signal when time Tsfp is changed. At this time, all of the variables excluding Tsfp in the write strategy are fixed. Thus, increasing time Tsfp is equivalent to shortening the width of the begin pulse. It is seen from the results of the measurements that, as time Tsfp is increased, the asymmetry changes in the negative direction. It is also seen that the error rate of the reproduced signal is best when time Tsfp=1.15 [T]. At this time, asymmetry 2 is almost zero, whereas asymmetry 1 is at about 8%. Thus, it can be said that asymmetry 2 is an evaluation index more sensitive to the error rate of the reproduced signal than asymmetry 1.

Similar experiments were performed with time Telp and time Tlc. The results of the experiments have shown that asymmetry 2 is an evaluation index more sensitive to the error rate of the recording and reproduced signal than asymmetry 1.

From the results, it can be said that, to hold the error rate of the reproduced signal below a specified value and keep the interchangeability of the information recording medium, the following conditions are necessary for the standard value (%) of asymmetry:

−Standard value A<Asymmetry 1<Standard value B  (4)

−Standard value C<Asymmetry 2<Standard value D  (5)

{Standard value $B-(-$Standard value $A)\}\geq\{$Standard value $D-(-$Standard value $C)\}$  (6)

Specifically, an information recording medium fulfilling the conditions can realize a high interchangeability. Experiment has shown that setting the standard values A and B to 5 to 15% and the standard value C to 3 to 15% enables a highly interchangeable signal to be recorded.

Next, the second higher harmonic, another evaluation index of recording and reproduced signals will be explained. The second higher harmonic is a signal component appearing in the frequency twice the carrier frequency, when an nT pattern, a signal with a pure tone, such as an NT mark and an NT space (n is an integer) is recorded and reproduced. When the second higher harmonic is great, this means that the recorded signal (mark/space) has an asymmetric distortion or a shifted duty.

Figure 7:
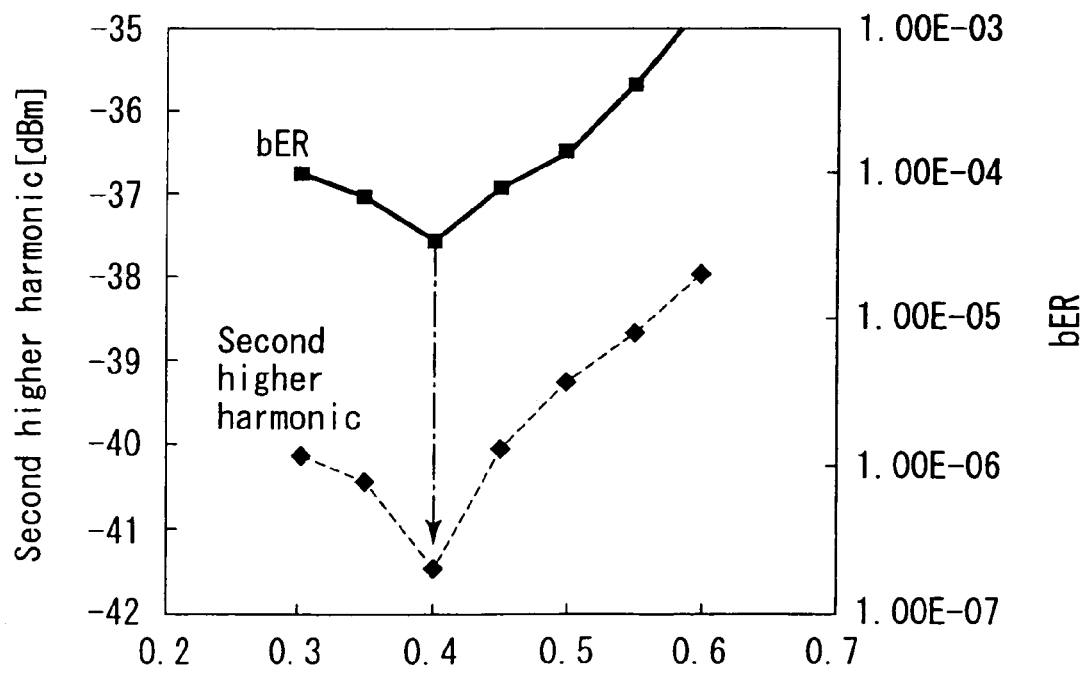
FIG. 7 shows the results of measuring the second higher harmonic and the error rate of a recording and reproduced signal.

The result of an experiment showing the relationship between the second higher harmonic and the error rate of recording and reproduced signals will be explained. FIG. 7 shows the results of the second higher harmonic and the error rate of recording and reproduced signals, when time Temp is changed. When time Temp is 0.4 [T], the error rate of recording and reproduced signals is the smallest. At this time, the second higher harmonic is also the smallest. From this, it is seen that the second higher harmonic is suitable for an evaluation index of recording and reproduced signals.

A write strategy determining method taking the results of the experiments into account will be explained.

Figure 8:
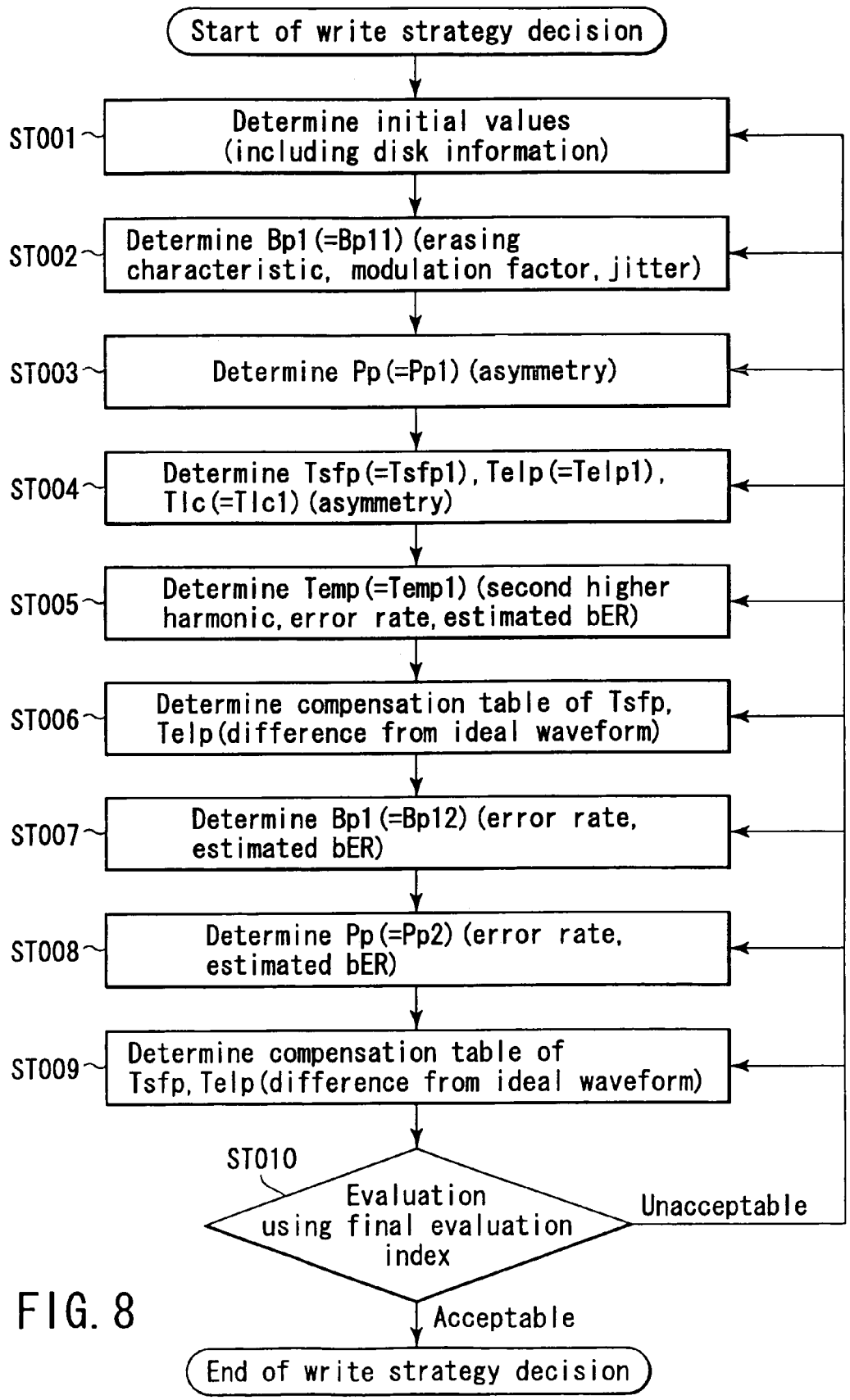
FIG. 8 is a flowchart to help explain a write strategy determining method according a first embodiment of the present invention.

FIG. 8 is a flowchart to help explain a write strategy determining method according a first embodiment of the present invention.

In a first step (ST001), all of the parameters, recording power Pp, erasing powers Bp1, Bp2, Bp3, and times Tsfp, Tefp, Tsmp, Temp, Tslp, Telp, Tlc are set to initial values (Pp0, Bp10, Bp20, Bp30, Tsfp0, Tefp0, Tsmp0, Temp0, Tslp0, Telp0, Tlc0), respectively. The values of the erasing powers Bp21, Bp31, or the relation between Bp21 and Bp31, and times Tefp1, Tslp1, or the relation between Tefp1 and Tslp1 are determined.

In a second step (ST002), the value of the erasing power Bp11 is determined. Using the erasing ratio and the modulation factor as indexes, the value is so determined that a sufficient margin for each of the erasing ratio and the modulation factor is secured. The modulation factor is a value obtained by standardizing the amplitude of the reproduced signal of the information composed of marks on the medium on the basis of a reference value, such as the magnitude of the signal obtained from the reflection from the mirror surface of the disk. A jitter value obtained in recording and reproducing a pattern not including the densest code may be used as an index producing a similar effect.

In a third step (ST003), the value of the recording power Pp1 is determined. Using the asymmetry of the signal as an index, the value is so determined that the value of the asymmetry is equal to or smaller than the standard value. The error rate of the signal or the estimated bER proposed in an earlier application filed by the applicant (Japanese Patent Application No. P2002-69138) may be used as an index producing the same effect.

In a fourth step (ST004), times Tsfp1, Telp1, TlC1 are determined. Using the asymmetry of the signal as an index, the values are so determined that the value of the asymmetry is equal to or smaller than the standard value.

In a fifth step (ST005), time Temp1 is determined. Using the second higher harmonic of the signal as an index, the value is so determined that the second higher harmonic becomes sufficiently small. The error rate of the signal, the estimated bER proposed in the earlier application filed by the applicant (Japanese Patent Application No. P2002-69138), or the asymmetry of a pure tone signal with a 5T or more code may be used as an index producing the same effect.

In a sixth step (ST006), a compensation table of times Tsfp, Telp corresponding adaptively to the pattern of a signal to be recorded is determined.

In a seventh step (ST007), the value of the erasing power Bp12 is determined. The value is determined using the error rate of the signal or the estimated bER as an index.

In an eighth step (ST008), the value of the recording power Pp2 is determined. The value is determined using the error rate of the signal or the estimated bER as an index.

In a ninth step (ST009), the compensation table of times Tsfp, Telp corresponding adaptively to the pattern of the signal to be recorded again is updated.

In a tenth step, the reproduced signal is evaluated using a final evaluation index. If the result of the evaluation is equal to or smaller than the standard value, the setting value at this point in time is determined to be the final write strategy. If the result of the evaluation has exceeded the standard, control goes back the steps and starts to set the write strategy again. The error rate of the signal or the estimated bER is used as the final evaluation index.

Next, each step in the write strategy determining method will be explained in detail.

Figure 26:
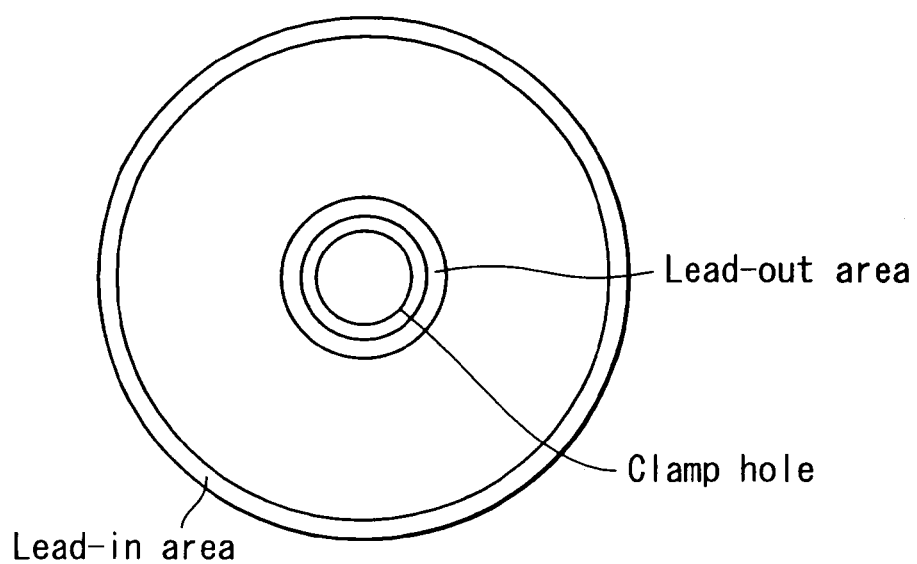
FIG. 26 schematically shows the configuration of an optical disk.

The values previously specified by the medium maker or the like on the basis of the characteristics of the medium, such as the result of thermal analysis, the values previously specified by the apparatus maker or the like on the basis of the recording and reproducing characteristics of the apparatus, and the values previously specified by the evaluator according to the characteristics of the medium on the basis of past experience are used as the initial values of the individual variables in the first step (ST001). The initial value information, medium information, and other factors are recorded in, for example, the lead-in area of an optical disk shown in FIG. 26 in the form of physical format information.

Further in the first step, Pp21 and Bp31, the values of the erasing powers Bp2, Bp3 for proceeding to the next step or the relation between Bp2 and Bp3 are determined on the basis of the initial values. There are two methods of determining the erasing power. One determining method is to fix the erasing powers Bp2, Bp3 to the initial values in the second and later steps. In this case, in the second and later steps, the erasing powers Bp2, Bp3 are not changed from the initial values. The other determining method is to calculate the ratio Bp10/Bp20 and the ratio Bp10/Bp30 from the erasing powers Bp10, Bp20, Bp30 given as initial values and fix the ratios in the second and later steps. In this case, when the erasing power Bp1 has changed in the second and later steps, the erasing powers Bp2, Bp3 are changed accordingly. The two methods are selectively used according to the characteristics or the like of the medium.

Similarly, the values of times Tefp1, Tsmp1, Tslp1 or the relation between Tftp1 and Tsfp1 are determined. There are two methods of determining the values. One determining method is to fix all the values to the initial values. The other determining method is to calculate the width (Tefp0−Tsfp0) of the begin pulse and the width (Telp0−Tslp0) of the end pulse from the initial values and fix the widths in the second and later steps. In this case, when times Tsfp1, Telp1 are changed, Tefp1 and Tslp1 are also changed. The two methods are selectively used according to the characteristics or the like of the medium.

In the second step (ST002), the erasing power Bp1 is so determined that a power margin for the erasing characteristic in overwriting is made the largest and the modulation factor of the signal is sufficiently secured. The values excluding the erasing power Bp1 are the ones determined in the first step.

An erasing ratio is defined as an evaluation index of the erasing characteristic as follows. When an mT pattern is overwritten to an nT pattern signal, the rate of the decrease from the amplitude of the nT pattern before overwriting to the amplitude after overwriting is defined as an nT overwrite (O.W.) mT erasing ratio. A method of determining the erasing power Bp1 in the second step will be described below.

Figure 9:
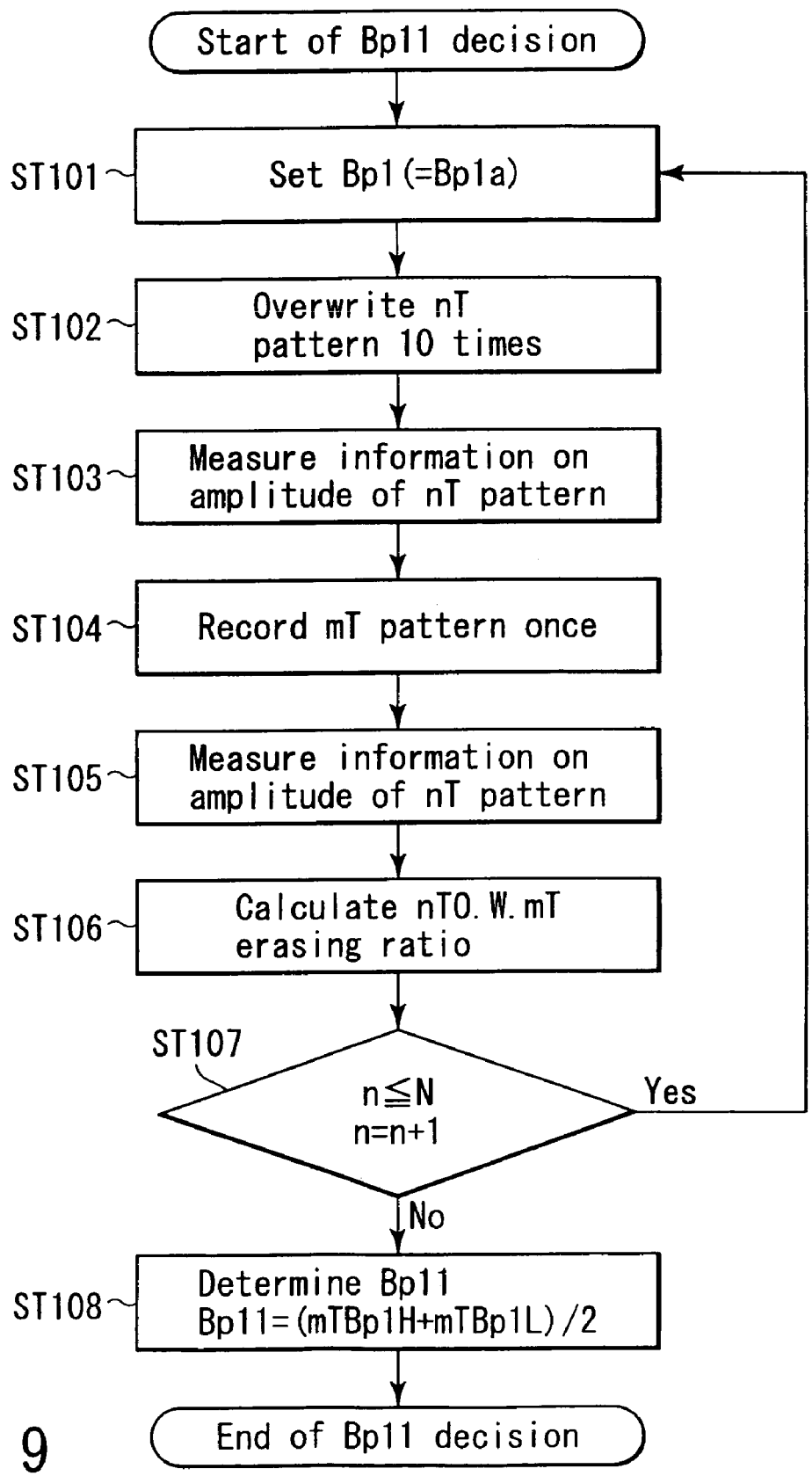
FIG. 9 is a flowchart to help explain a first erasing power Bp11 determining method.

FIG. 9 is a flowchart for the method of determining the first erasing power Bp11. In step ST101, from the initial value Bp10 of erasing power Bp1, erasing power Bp1$a$ is determined using the following equation:

$$Bp1a=(Bp10-A/2)+n\times(A/N) \qquad (7)$$

where A is the evaluation range of Bp1 (see FIG. 10), n is the number of repetitions, and N is the maximum number of repeated steps.

In step ST102, an nT pattern is overwritten on the same track ten times. In step ST103, information on the amplitude of the recorded and reproduced nT pattern is measured with a spectrum analyzer or the like. The measured values are stored. In step ST104, an mT pattern is overwritten once on the same track as that in step ST102. In step ST105, the information recorded on the track is reproduced. The amplitude information on the reproduced nT pattern is measured with a spectrum analyzer or the like. The measured value is stored. In step ST106, the nTO.W.mT erasing ratio is calculated from the ratio of the two amplitude information items stored in step ST103 and step ST105. The result is stored. If n≦N (Yes in step ST107), control goes back to step ST101, where erasing power Bp1$a$ is increased by A/N. Then, step ST102 to step ST107 are carried out again. In this way, step ST101 to step ST106 are carried out repeatedly until n=N is fulfilled, in such a manner that erasing power Bp1$a$ is increased by A/N each time.

Figure 10:
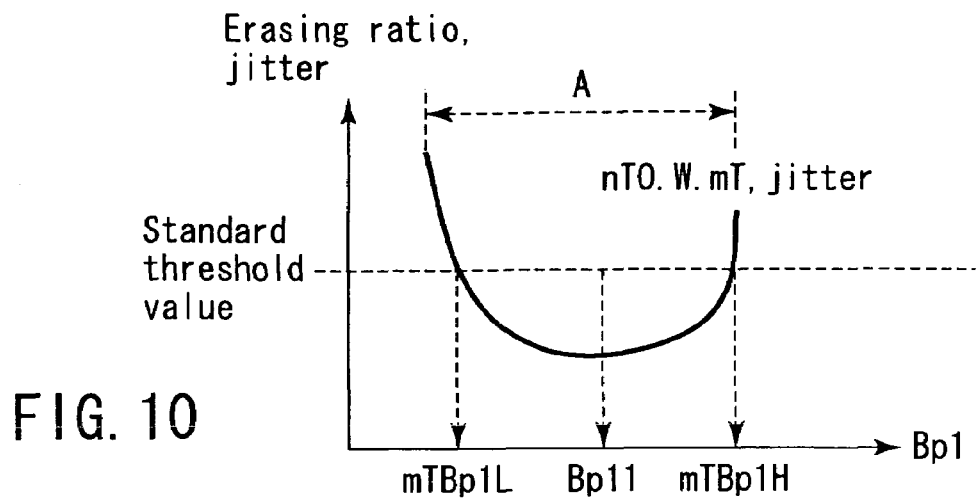
FIG. 10 is a diagram to help explain the first erasing power Bp11 and the nTO.W.mT erasing ratio.

At this time, when the calculated and stored nTO.W.nT ratios are plotted, this gives a curve as shown in FIG. 10. Here, the erasing characteristic is evaluated sequentially, starting at a low power upward. In step ST108, from the curve, two powers mTBp1H and mTBp1L at the intersections of the curve and the standard threshold value of the predetermined nTO.W.mT erasing ratio are determined. Furthermore, using the following equation, the erasing power Bp11 is determined and then set as the value of the erasing power Bp1:

$$Bp11=(mTBp1H+mTBp1L)/2 \qquad (8)$$

where mT is the densest code used in the modulation law and nT is the longest code fulfilling n≠m×2×k (k is a natural number) among the codes used in the modulation law.

Figure 11:
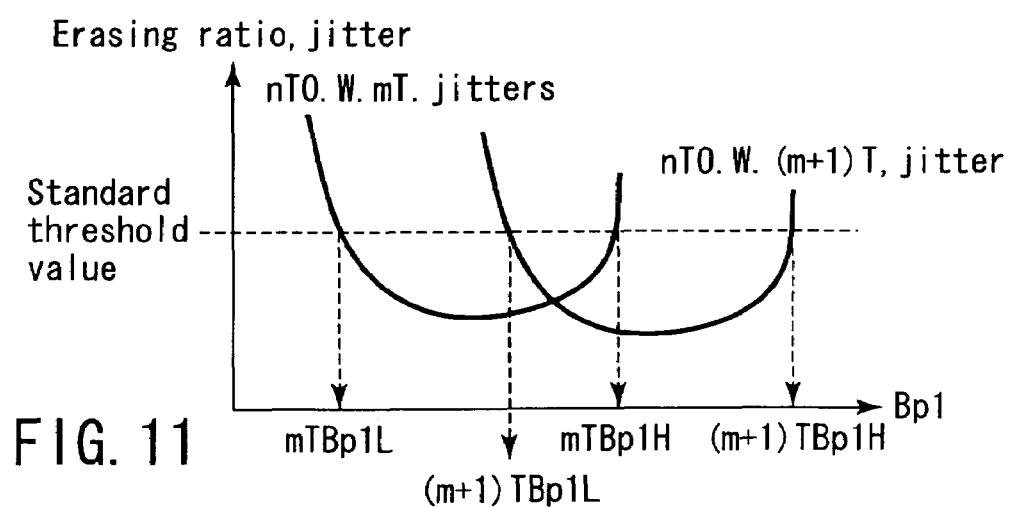
FIG. 11 is a diagram to help explain a second erasing power Bp11 determining method.

A method of determining the second erasing power Bp11 may be to measure the nTO.W.(m+1)T earsing ratio using the above method in addition to the nTO.T.mT erasing ratio as shown in FIG. 11 and determine erasing power Bp11 as follows:

$$Bp11=((m+1)TBp1H+mTBp1L)/2 \qquad (9)$$

Figure 12:
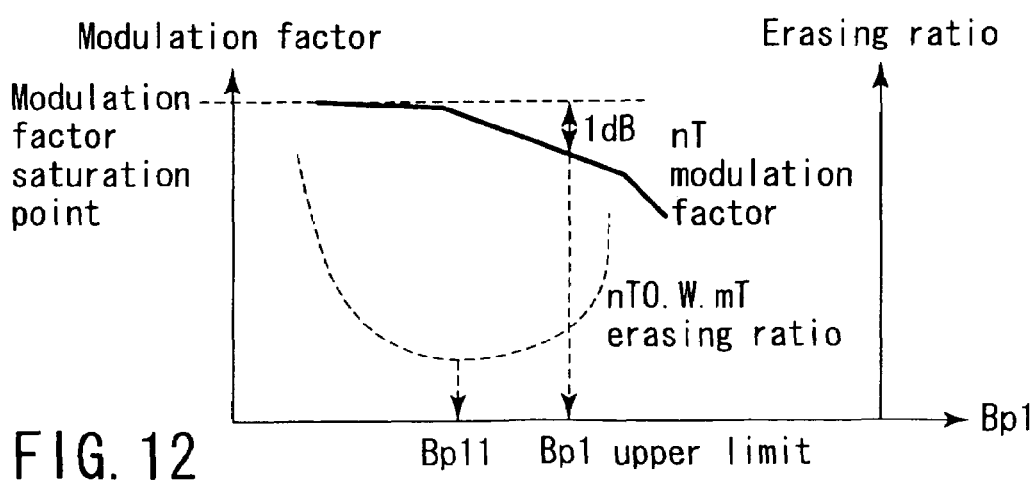
FIG. 12 is a diagram to help explain a third erasing power Bp11 determining method.

A method of determining the third erasing power Bp11 is to evaluate not only the erasing ratio but also the modulation factor of a signal. As in the first determining method, in this method, a power margin for the erasing characteristic is measured. In addition, an nT pattern is overwritten 10 times, while erasing power Bp1$a$ is being changed in the same sequence. Then, the modulation factor of the signal or the C/N is measured. The result of the measurement is shown in FIG. 12. From the erasing characteristic calculated in FIG. 10 or FIG. 11 and the result in FIG. 12, the erasing power Bp1$a$ that achieves the highest erasing rate in the range where a decrease in the modulation factor is within 1 dB from the saturated region is determined to be the value of the erasing power Bp11.

Another method is to use jitter or bER as an evaluation index in place of the nTO.W.mT erasing ratio.

A method of determining the fourth erasing power Bp11 is to measure pure tone jitter in a kT pattern and an (m+1)T pattern, while changing the erasing power Bp1$a$ and determine the erasing power Bp1 so that a margin for jitter may become the greatest. The erasing power Bp1 is set as the value of the erasing power Bp11, which completes the determining process. Here, k is the least dense code used in the modulation law.

In the third step (ST003), the recording power Pp is so determined that the asymmetry of the reproduced signal is equal to or smaller than the standard value. As in the second step, in the third step, while the recording power Pp is being changed sequentially, starting at a low power upward, the test data is recorded and the evaluation index is measured. The values of the erasing powers Bp1, Bp2, Bp3 are the ones determined in the second step. The pulse width is the value determined in the first step.

Asymmetry 1, asymmetry 2, and asymmetry 3 defined as described above can be used as evaluation indexes of asymmetry in the third step. Because asymmetry is corrected in detail in the fourth step, for example, only asymmetry 1 or asymmetry 3 to strike the overall balance may be corrected in the third step.

In this case, asymmetry can be measured by recording, for example, random data, sensing the values of I13H, I13L, I2H, I2L in FIG. 3 from the digitized result of and the decoded result of the waveform of the reproduced signal, and doing calculations using equation (1).

Figure 13:
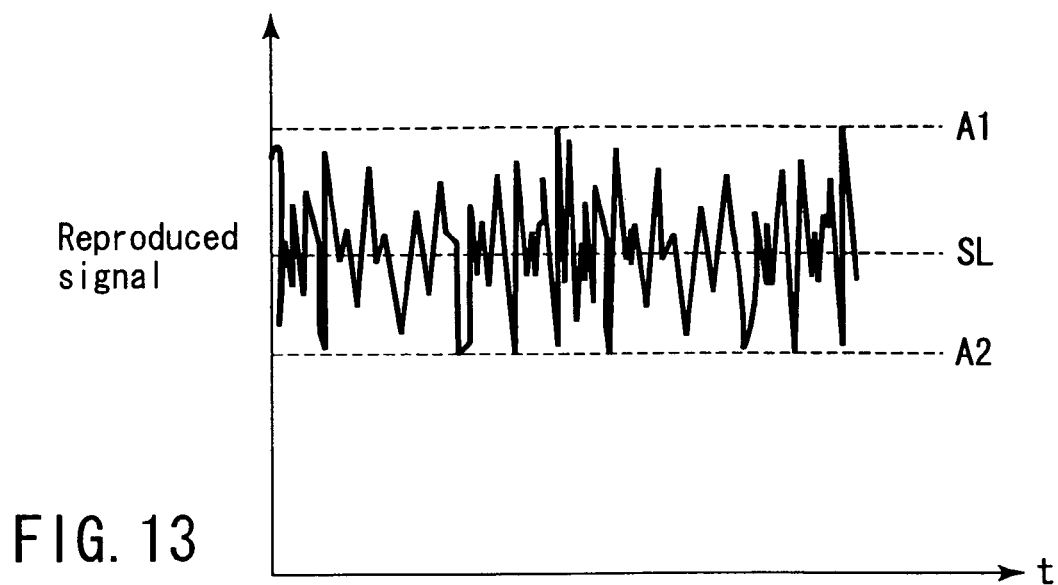
FIG. 13 is a diagram to help explain another method of measuring asymmetry.

When it is difficult to measure asymmetry directly, a method shown in FIG. 13 can be used. The signal shown in FIG. 13 is a signal to which duty feedback is applied in such a manner that the center of the signal comes to a slice level SL automatically. The high level A1 and the low level A2 of the signal are measured to calculate the following value S1:

$$S1=\{(A1-SL)+(A2-SL)\}/(A1-A2) \qquad (10)$$

Figure 14:
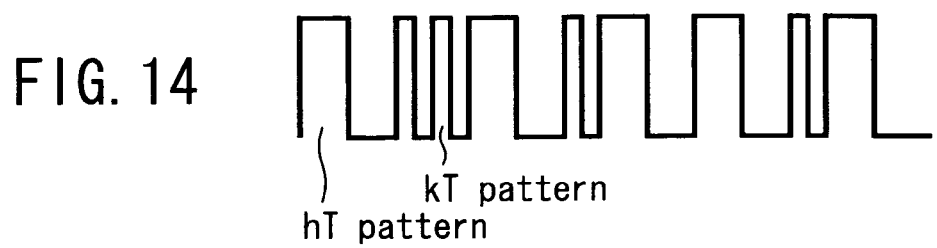
FIG. 14 is a diagram to help explain another method of measuring asymmetry.

When a correction is made to make the value zero, this has almost the same effect as when asymmetry 1 is made zero. Furthermore, this method can be applied to a case where the slice level SL is zero, that is, to a DC-cut signal. As test data recorded at this time, random data similar to user data may be used. Alternatively, data obtained by combining two types of patterns, hT and kT, for measuring asymmetry as shown in FIG. 14 may be used. Here, h is the densest code and k is the least dense code.

Figure 15:
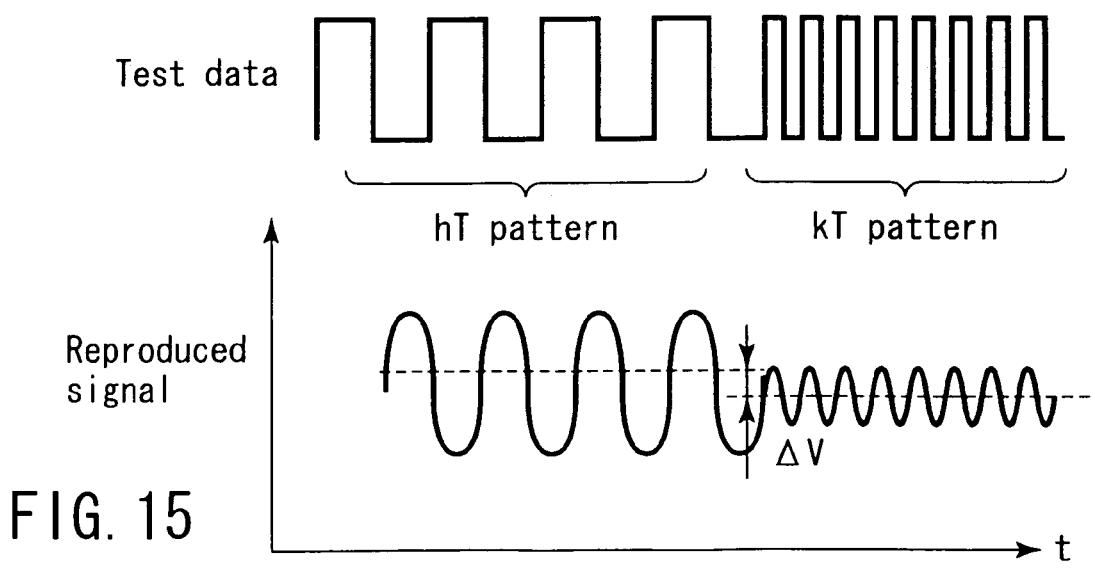
FIG. 15 is a diagram to help explain another method of measuring asymmetry.

In addition, an hT pattern and a kT pattern as shown in FIG. 15 may be recorded and reproduced independently as test data. After the center voltages of the hT pattern and kT pattern are measured, the difference ΔV between them is used as an evaluation index. When a correction is made to make the difference zero, this has almost the same effect as when asymmetry 1 is made zero.

Figure 16A:
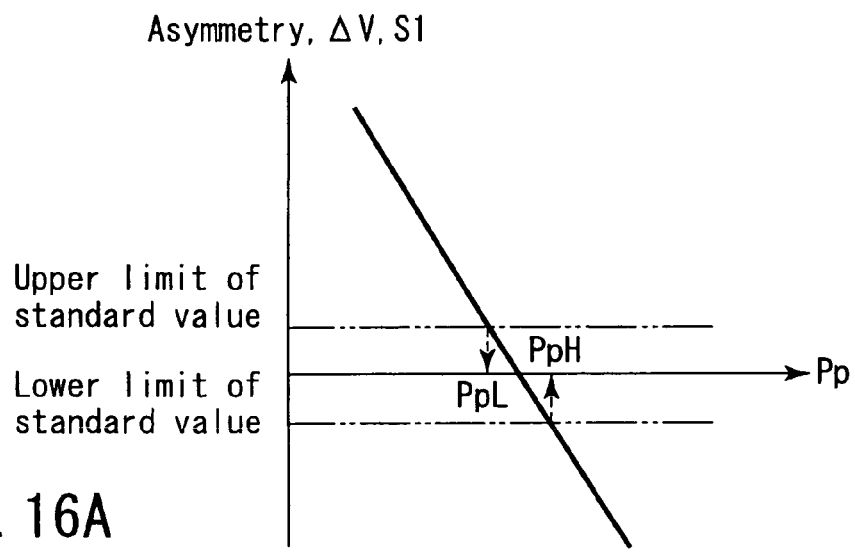
FIGS. 16A and 16B show states of changes in the setting values and evaluation indexes (asymmetry 1, S, ΔV) of the recording power Pp.

FIG. 16A shows how the setting value of the recording power Pp obtained in the third step and the evaluation indexes (asymmetry 1, S, ΔV) change. From FIG. 16A, the values PpH and PpL of the recording power Pp at the intersections of the upper limit and lower limit of the standard value and the measured value are calculated. Then, using the following equation, the recording power Pp is determined:

$$Pp=(PpH+PpL)/2 \quad (11)$$

Figure 16B:
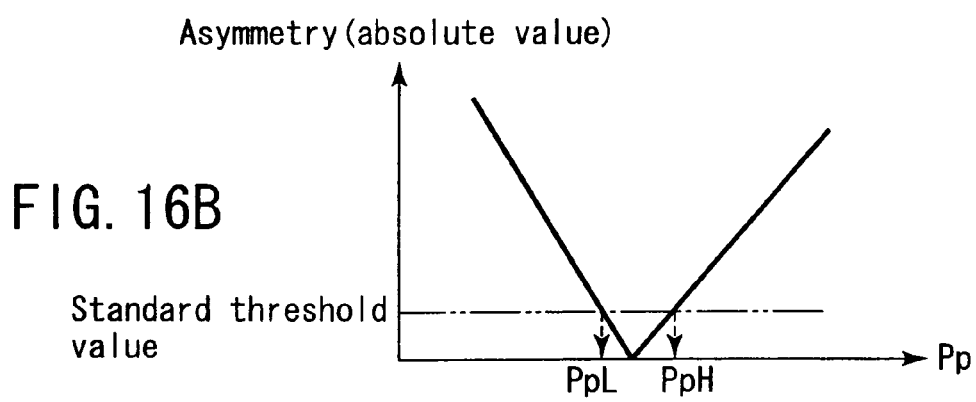

Plotting the absolute values of asymmetry 1 as evaluation indexes as shown in FIG. 16B produces the same effect.

When the standard value is reached, the value may be determined to be the recording power Pp without using equation (11).

In the fourth step (ST004), times Tsfp1, Telp1, Tlc1 are so determined that the asymmetry of the reproduced signal is corrected in further detail. In the fourth step, while, for example, the value of time Tsfp is being changed sequentially from a large value to a smaller one, the test data is recorded and the evaluation indexes are measured. The value of the recording power Pp is the value determined in the third step and the values of the erasing powers Bp1, Bp2, Bp3 are the ones determined in the second step. The pulse width is the value determined in the first step.

Asymmetry 1 and asymmetry 2 defined as described above can be used as evaluation indexes of asymmetry in the fourth step. Because asymmetry can be corrected in detail in the fourth step and a rough correction has been made in the third step, for example, only asymmetry 2 serving as a highly sensitive asymmetry may be corrected in the fourth step.

In this case, asymmetry can be measured by sensing the values of I3H, I3L, I2H, I2L from the digitized result of and the decoded result of the waveform of the reproduced signal and doing calculations using equation (2).

Figure 17A:
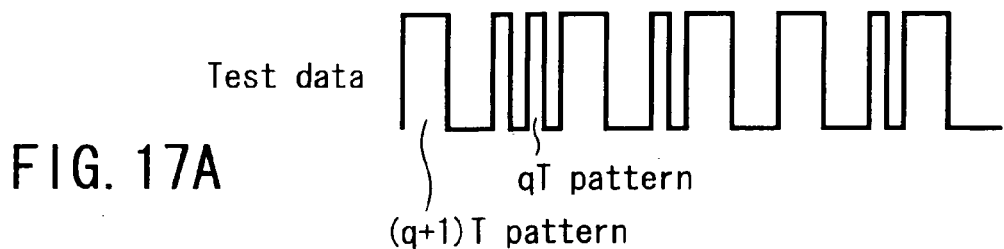
FIGS. 17A and 17B show another method of measuring asymmetry.
Figure 17B:
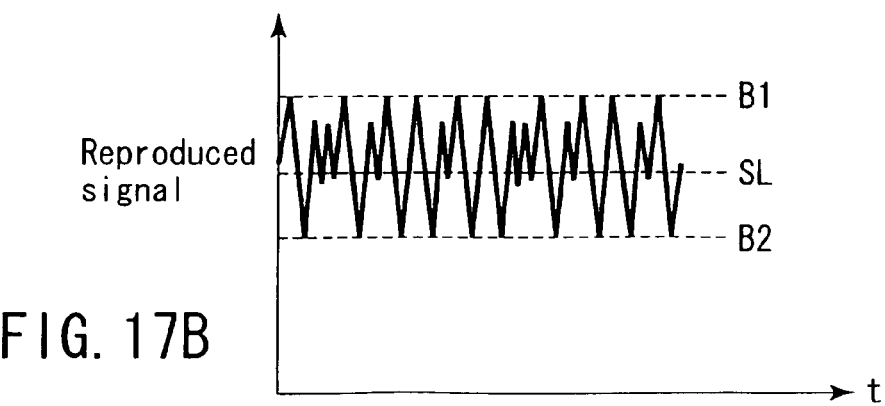

When it is difficult to measure asymmetry directly, a method shown in FIGS. 17A and 17B can be used. In this case, a pattern where qT and (q+1)T marks and spaces appear at random as shown in FIG. 17A is used as test data. Here, q is the densest code. Moreover, the signal shown in FIG. 17B is a signal obtained by recoding the signal of FIG. 17A and applying duty feedback to the reproduced signal so that the center of the reproduced signal may come to the slice level SL. The high level B1 and the low level B2 of the signal are measured to calculate the following value S2:

$$S2=\{(B1-SL)+(B2-SL)\}/(B1-B2) \quad (12)$$

When a correction is made to make the value zero, this has almost the same effect as when asymmetry 2 is made zero.

Furthermore, this method can be applied to a case where the slice level is zero, that is, to a DC-cut signal.

In addition, a qT pattern and a (q+1)T pattern may be recorded and reproduced independently as test data. After the center voltages of the qT pattern and (q+1)T pattern are measured, the difference ΔV between them is used as an evaluation index. When a correction is made to make the difference zero, this has almost the same effect as when asymmetry 2 is made zero.

Figure 18A:
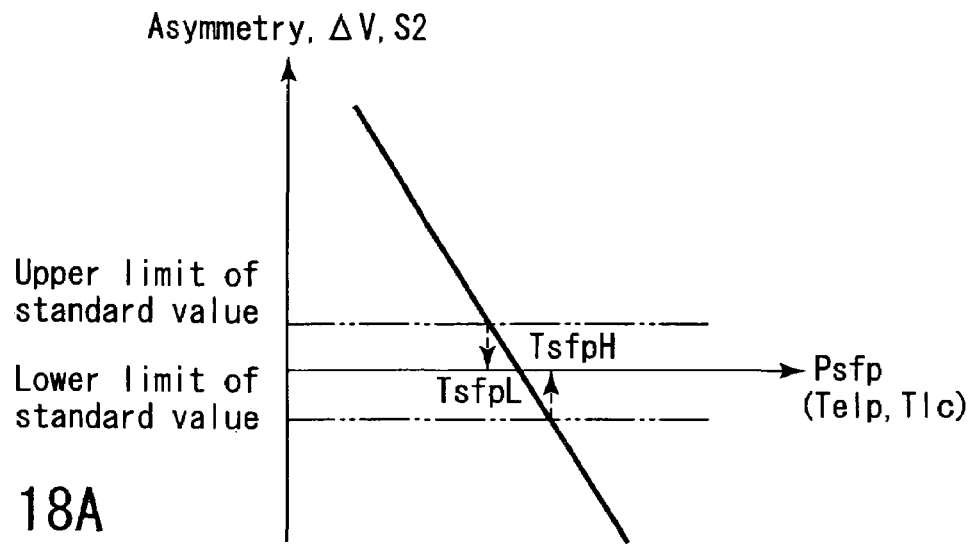
FIGS. 18A and 18B show states of changes in the setting values and evaluation indexes of times Tsfp, Telp, Tlc.

FIG. 18A shows how the setting values of times Tsfp, Telp, Tlc and the evaluation indexes (asymmetry 2, S2, ΔV) change. From FIG. 18A, the values of time Tsfp, TsfpH, and TsfpL at the intersections of the upper limit and lower limit of the standard value and the measured value are calculated. Then, using the following equation, time Tsfp is determined:

$$Tsfp1=(TsfpH+TsfpL)/2 \quad (13)$$

When the standard value is reached, the value may be determined to be the recording power Pp without using equation (13).

Figure 18B:
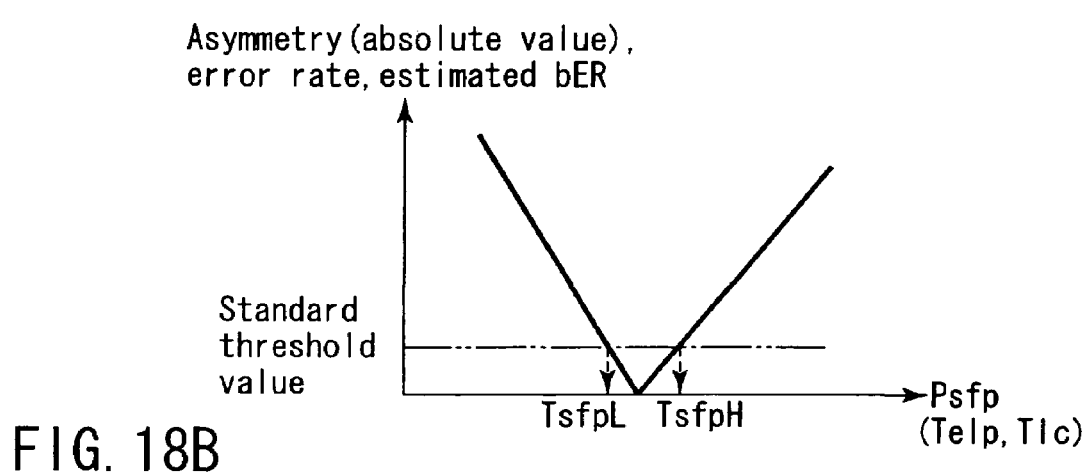

The error rate of the signal or the estimated bER may be used as another evaluation index. In this case, too, as with asymmetry, while time Tsfp is being changed sequentially from a large value to a smaller one, the signal is evaluated, giving a graph as shown in FIGS. 18A and 18B. The values at the intersections with the standard threshold value of the evaluation index are set as TsfpH and TsfpL. Tsfp1 is determined using equation (13).

Time Telp and time Tlc are determined in the same manner.

In the fifth step (ST005), time Temp1 is so determined that the distortion of the reproduced waveform of a long mark becomes small. In the fifth step, time Temp is being changed from a small value to a larger one, the test data is written on trial and the evaluation indexes are measured. The value of the recording power Pp is the value determined in the third step and the values of the erasing powers Bp1, Bp2, Bp3 are the values determined in the second step. Times Tefp, Tsmp, Tslp are the values determined in the first step and times Tsfp, Telp, Tlc are the values determined in the fourth step.

The second higher harmonic can be used as an evaluation index in the fifth step. An sT pattern is used as the test data. Here, s is the least dense code, or a relatively long code, such as a 5T or more code.

Figure 19A:
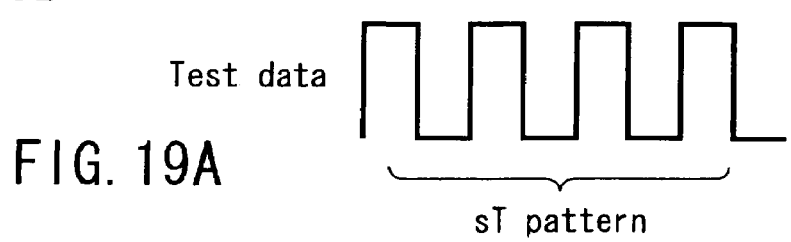
FIGS. 19A and 19B show another method of measuring the second higher harmonic.
Figure 19B:
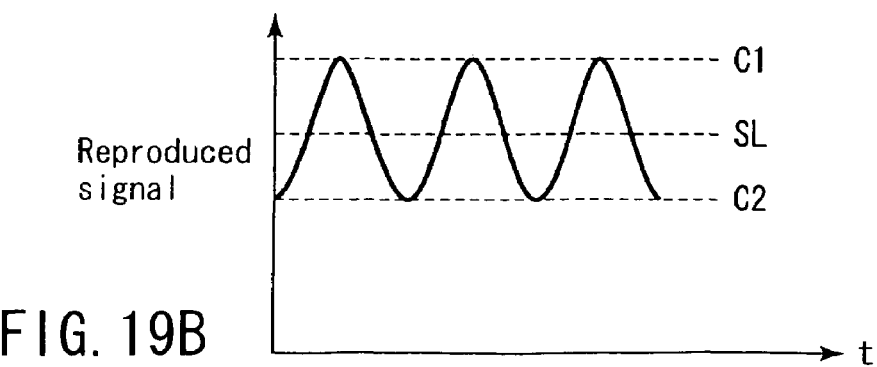

When it is difficult to measure the second higher harmonic directly, an sT pattern is recorded and reproduced as shown in FIGS. 19A and 19B. Then, S3 is evaluated using the following equation:

$$S3=\{(C1-SL)+(C2-SL)\}/(C1-C2) \quad (14)$$

When the value is made zero, this has almost the same effect as when the second higher harmonic is decreased.

FIGS. 20A and 20B show how the setting value of time Temp1 obtained in the fifth step and the evaluation indexes change. FIG. 20A shows a case where S3 is used as an evaluation index. FIG. 20B shows a case where the second higher harmonic is used as an evaluation index. From FIGS. 20A and 20B, the values of time Temp, TempL and TempH, at the intersections of the upper limit and lower limit of the evaluation index and the measured value are calculated. Then, using the following equation, time Temp is determined:

$$Temp1=(TempH+TempL)/2 \quad (15)$$

When the standard value is reached, the value may be determined to be Temp1 without using equation (15).

The error rate of the signal or the estimated bER may be used. In this case, too, while time Temp is being changed sequentially from a small value to a larger one, the signal is evaluated, giving a graph as shown in FIG. 20A.

In the sixth step (ST006), a compensation table is determined. In this step, times Tsfp, Telp are set adaptively according to a combination of consecutive spaces and mark codes or an arrangement of marks and spaces in such a manner that the nonlinearly of the reproduced signal or the difference from an ideal waveform are removed. A table shown in FIGS. 21A and 21B are for setting the values of times Tsfp, Telp of a mark to be recorded according to the preceding space or the following space. The table is called a compensation table.

Figure 22:
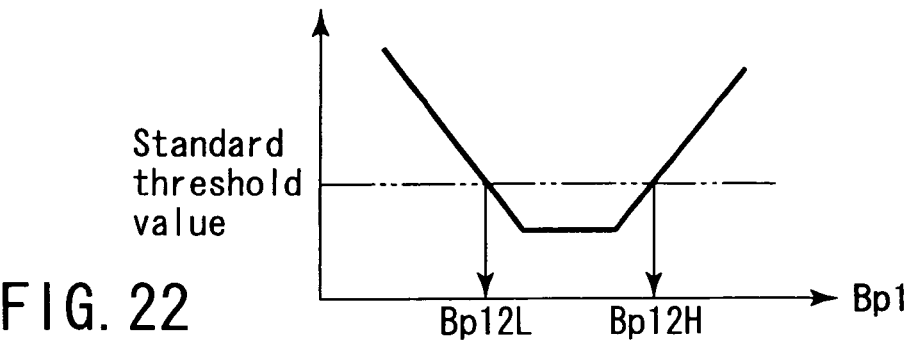
FIG. 22 shows the relationship between the erasing power Bp1 and evaluation indexes (error rate, estimated bER)

In the seventh step (ST007), a random signal is recorded and fine adjustment of Bp1 is made using the error rate of the reproduced signal serving as the final evaluation index, or an evaluation index closely related to the error rate, for example, the estimated bER. While the value of Bp1 is being changed, the random signal is overwritten 10 times. Each time the random signal is overwritten, the evaluation index is evaluated. The value of Bp1 is increased sequentially from a low value. FIG. 22 shows the result of the measurement. From the curve in FIG. 22, Bp12L and Bp12H at the intersections with the standard threshold value are determined. Then, Bp12 is determined using the following equation:

$$Bp12=(Bp12H+Bp12L)/2 \quad (16)$$

Figure 23:
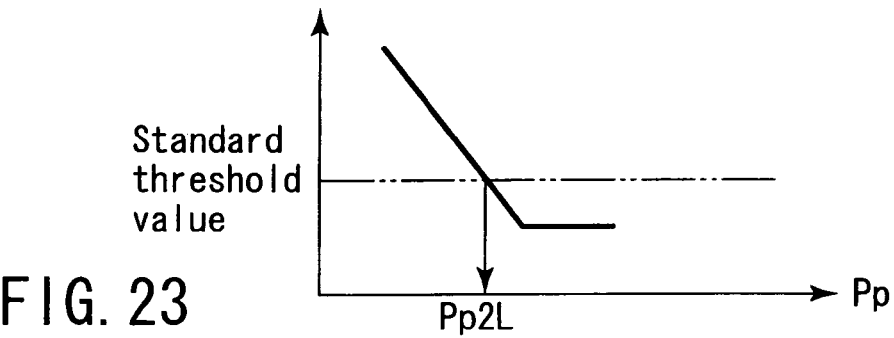
FIG. 23 shows the relationship between the recording power Pp and evaluation indexes (error rate, estimated bER)

In the eighth step (ST008), a random signal is recorded and a fine adjustment of Pp is made using the error rate of the reproduced signal serving as the final evaluation index, or an evaluation index closely related to the error rate, for example, the estimated bER. While the value of the recording power Pp is being changed, the random signal is overwritten 10 times. Each time the random signal is overwritten, the evaluation index is evaluated. The value of Pp is increased sequentially from a low value. FIG. 23 shows the result of the measurement. From the curve in FIG. 23, Pp2L at the intersection with the standard threshold value is determined. Then, Pb2 is determined using the following equation:

$$Pp2=Pp2L \times \alpha \quad (17)$$

where $\alpha$ is a coefficient determined by the characteristics of the medium and is recorded in the physical format information or the like in the lead-in area 50.

In the ninth step (ST009), the compensation table of times Tsfp and Telp is recalculated. In this step, the amount of compensation is determined in the same manner as in the sixth step.

In the tenth step (ST010), the error rate of the random signal recorded using the finally determined write strategy or an evaluation index related to the error rate is measured. If the value is better than the standard value, the write strategy determined in the tenth step is set as the final determined value of the write strategy. If the evaluated value is worse than the standard value, control returns to the previous steps and the determination of write strategy is started again. If an optical disk to be recorded into is of the land-and-groove recording type, the same processes are carried out on lands and grooves.

In the write strategy determining method of the embodiment, jitter in a signal including the densest code is not used as an evaluation index in any stage. Therefore, the method can be applied to high-density recording where the signal amplitude of the densest code is so small that binarization cannot be made by the slice method or jitter cannot be measured. Moreover, by adjusting both the recording power and the pulse width in the course of the processing, the asymmetry of the signal is decreased. As a result, when the method is applied to an identification method using information in the amplitude direction, such as PRML, this produces a great effect.

Furthermore, use of the densest code defined in this application and asymmetry 2, the asymmetry of the next densest code, enables an ideal signal to be recorded. Since changing the pulse width enables finer adjustment to be made than changing the recording power, the recording power is evaluated and determined in terms of asymmetry for balancing all of the random signal and the pulse width is determined in asymmetry 2, which enables such an adjustment as makes the overall balance of any medium compatible with the balance between the densest code and the next densest code in the signal.

In addition, use of the process of adjusting time Temp, the width of an intermediate pulse, by evaluating the second higher harmonic and the error rate makes it possible to eliminate asymmetry in front of and behind a relatively long recording mark. As a result, when the method is applied to an identification method using information in the amplitude direction, such as PRML, this produces a great effect.

Because asymmetry and asymmetry in front of and behind a mark is removed before a compensation table according to an arrangement of marks and spaces having various length is determined as in step ST006, the table neither converges on the non-ideal result nor diverges, which makes it possible to determine the compensation table properly. That is, it is possible to determine the optimum pulse form simply in a short time.

As described above, use of the write strategy determining method of the first embodiment makes it possible to record information with a good reproducing characteristic and a high interchangeability even on an optical disk capable of high-density recording.

Figure 24:
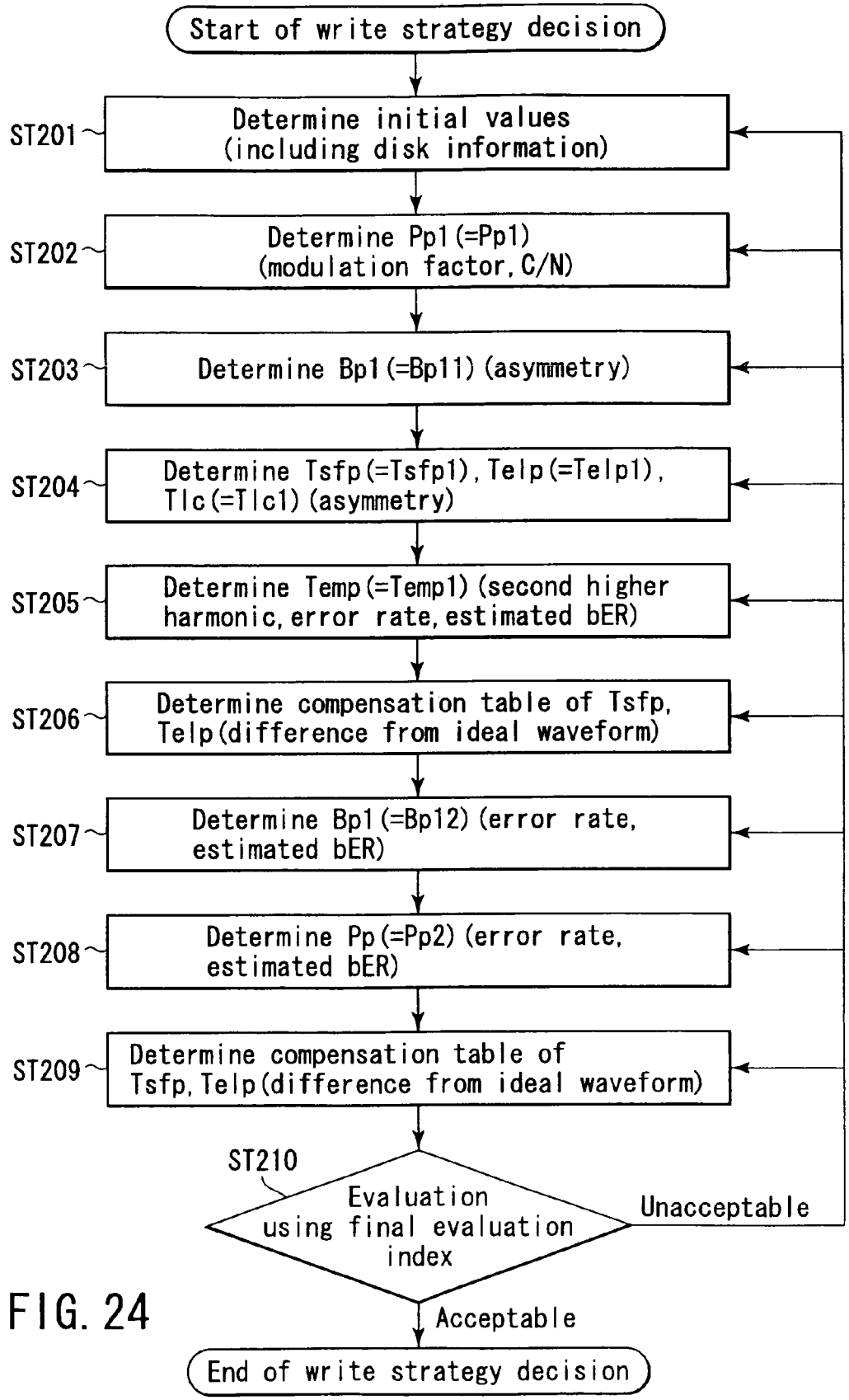
FIG. 24 is a flowchart to help explain a second embodiment of the write strategy determining method according to one embodiment of the present invention.

Next, a second embodiment of the write strategy determining method according to the present invention will be explained. FIG. 24 is a flowchart for the second embodiment. The second embodiment is the same as the first embodiment, except that a second and a third step (ST202, ST203) differ from the second and third steps (ST002, ST003) in the first embodiment.

As in step ST001 of the first embodiment, in a first step (ST201), all of the parameters, recording power Pp, erasing powers Bp1, Bp2, Bp3, times Tsfp, Tefp, Tsmp, Temp, Tslp, Telp, Tlc, are set to initial values (Pp0, Bp10, Bp20, Bp30, Tsfp0, Tefp0, Tsmp0, Temp0, Tslp0, Telp0, Tlc0), respectively. The values of the erasing powers Bp21, Bp31, or the relation between Bp21 and Bp31, and times Tefp1, Tslp1, or the relation between Tefp1 and Tslp1 are determined.

In a second step (ST202), the value of the recording power Pp1 is determined. The value is determined on the basis of the amplitude of the signal, C/N, or the modulation factor. At this time, the signal may be recorded on adjacent tracks, which enables the recording power Pp1 to be determined, taking crosstalk and cross erase into account.

In a third step (ST203), the value of the erasing power Bp11 is determined. Using the asymmetry of the signal as an index, the value is so determined that the value of the asymmetry is equal to or smaller than the standard value. The error rate of the signal or the estimated bER may be used as an index producing the same effect.

In a fourth step (ST204), times Tsfp1, Telp1, Tlc1 are determined. Using the asymmetry of the signal as an index, the values are so determined that the value of the asymmetry is equal to or smaller than the standard value.

In a fifth step (ST205), time Temp1 is determined. Using the second higher harmonic of the signal as an index, the value is so determined that the second higher harmonic becomes sufficiently small. The error rate of the signal, the estimated bER, or the asymmetry of a pure tone signal of a 5T or more code may be used as an index producing the same effect.

In a sixth step (ST206), a compensation table of Tsfp1, Telp1 corresponding adaptively to the pattern of a signal to be recorded is determined.

In a seventh step (ST207), the value of the erasing power Bp12 is determined. The value is determined using the error rate of the signal or the estimated bER as an index.

In an eighth step (ST208), the value of the erasing power Pp2 is determined. The value is determined using the error rate of the signal or the estimated bER as an index.

In a ninth step (ST209), the compensation table of Tsfp1, Telp1 corresponding adaptively to the pattern of the signal to be recorded again is updated.

In a tenth step (ST210), the reproduced signal is evaluated using a final evaluation index. If the result of the evaluation is equal to or smaller than the standard value, the setting value at this point in time is determined to be the final write strategy. If the result of the evaluation has exceeded the standard value, control goes back the steps and starts to set the write strategy again. The error rate of the signal or the estimated bER is used as the final evaluation index. In this way, the write strategy determining process in the second embodiment is completed.

In the first embodiment, since the erasing power Bp1 is determined mainly on the basis of the erasing characteristic and the recording power Pp is determined mainly on the basis of asymmetry, the modulation factor (or amplitude) of the signal may converge on a non-ideal place, depending on the situation. Some media have a relatively wider margin for the erasing characteristic and a narrower margin for the modulation factor, depending on the characteristics of the mediums. Because of the effect of crosstalk and cross erase of the signal recorded on the adjacent tracks, the modulation factor of the signal may be limited. In such a case, the recording power Pp is adjusted earlier, thereby determining the modulation factor of the signal, and thereafter the erasing power Bp1 is determined as described in the second embodiment. Because the asymmetry of the signal is influenced seriously by the ratio of the erasing power Bp1 to the recording power Pp, the recording power Pp is fixed and the erasing power Bp1 is changed, which enables the asymmetry to be reduced accurately.

Figure 25:
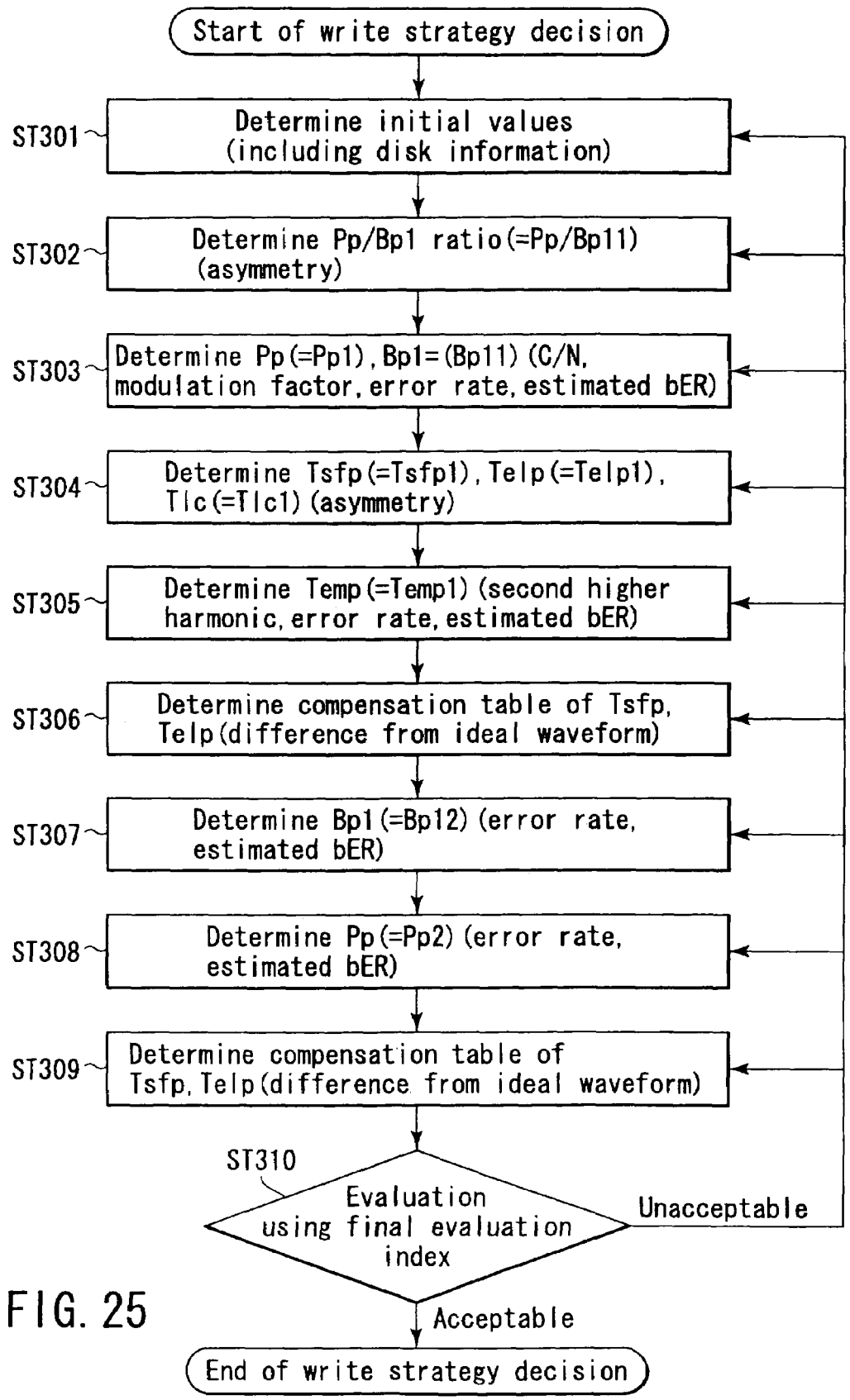
FIG. 25 is a flowchart to help explain a third embodiment of the write strategy determining method according to one embodiment of the present invention.

Next, a third embodiment of the write strategy determining method according to the present invention will be explained. FIG. 25 is a flowchart for the third embodiment. The third embodiment is the same as the first embodiment, except that a second and a third step (ST302, ST303) differ from the second and third steps (ST002, ST003) in the first embodiment.

As in step ST001 of the first embodiment, in a first step (ST301), all of the parameters, recording power Pp, erasing powers Bp1, Bp2, Bp3, times Tsfp, Tefp, Tsmp, Temp, Tslp, Telp, Tlc, are set to initial values (Pp0, Bp10, Bp20, Bp30, Tsfp0, Tefp0, Tsmp0, Temp0, Tslp0, Telp0, Tlc0), respectively. The values of the erasing powers Bp21, Bp31, or the relation between erasing powers Bp21 and Bp31, and Tefp1, Tslp1, or the relation between Tefp1 and Tslp1 are determined.

In a second step (ST302), the value of Pp/Bp11 is determined. Using the asymmetry of the signal as an index, the value is so determined that the value of the asymmetry is equal to or smaller than the standard value.

In a third step (ST303), the recording power Pp1 is determined. At the same time, the value of the erasing power Bp11 is determined from Pp/Bp11. The value is determined on the basis of the amplitude of the signal, C/N, or the modulation factor and the erasing ratio. The error rate of the signal or the estimated bER may be used as an index producing the same effect. At this time, the signal may be recorded on adjacent tracks, which enables the recording power Pp1 to be determined, taking crosstalk and cross erase into account.

In a fourth step (ST304), times Tsfp1, Telp1, Tlc1 are determined. Using the asymmetry of the signal as an index, the values are so determined that the value of the asymmetry is equal to or smaller than the standard value.

In a fifth step (ST305), time Temp1 is determined. Using the second higher harmonic of the signal as an index, the value is so determined that the second higher harmonic becomes sufficiently small. The error rate of the signal, the estimated bER, or the asymmetry of a pure tone signal of a 5T or more code may be used as an index producing the same effect.

In a sixth step (ST306), a compensation table of Tsfp1, Telp1 corresponding adaptively to the pattern of a signal to be recorded is determined.

In a seventh step (ST307), the value of the erasing power Bp12 is determined. The value is determined using the error rate of the signal or the estimated bER as an index.

In an eighth step (ST308), the value of the recording power Pp2 is determined. The value is determined using the error rate of the signal or the estimated bER as an index.

In a ninth step (ST309), the compensation table of Tsfp1, Telp1 corresponding adaptively to the pattern of the signal to be recorded again is updated.

In a tenth step (ST310), the reproduced signal is evaluated using a final evaluation index. If the result of the evaluation is equal to or smaller than the standard value, the setting value at this point in time is determined to be the final write strategy. If the result of the evaluation has exceeded the standard value, control goes back the steps and starts to set the write strategy again. The error rate of the signal or the estimated bER is used as the final evaluation index. In this way, the write strategy determining process in the third embodiment is completed.

In an ordinary medium, the asymmetry of the signal is characterized in that it is influenced heavily by the ratio of the erasing power Bp1 to the recording power Pp, but, with the ratio of the erasing power Bp1 to the recording power Pp being kept constant, it does not change much, even when the absolute value changes.

In the first embodiment, after the erasing power Bp1 is determined on the basis of the erasing characteristic, the recording power Pp is determined on the basis of the asymmetry. Therefore, depending on the situation, the recording power Pp becomes relatively high, which makes a recorded mark larger. As a result, there is a possibility that the erasing characteristic will become worse with the determined erasing power Bp1.

In contrast, in the third embodiment, the ratio of the erasing power Bp1 to the recording power Pp is determined and thereafter the absolute value is changed, with the ratio being kept constant. This makes it possible to determine a write strategy with the modulation factor, erasing ratio, crosstalk, and cross erase most suitably in balance.

Furthermore, it has been found that the asymmetry of the signal depends largely on the ratio of the first level to the second level and that the erasing characteristic depends on the erasing power, the modulation factor depends on the recording power, and jitter in a single frequency signal depend on both of the powers.

To optimize the asymmetry, the ratio of the erasing power to the recording power is adjusted. In addition, the absolute values of the first and second levels are so determined to optimize the erasing characteristic, the modulation factor, or jitter in a single frequency signal. By doing these, the optimum pulse level can be determined accurately in a short time.

Next, the evaluation of a user data (random data) reproduced signal modulated by (1, 10) RLL modulation will be explained. RLL is an abbreviation of run-length limited. (1, 10) RL1 modulation is a modulation rule that the upper limit of the number of consecutive channel bit $0s$ or $1s$ is limited to 11 and the lower limit of the number of consecutive channel bit $0s$ or $1s$ is limited to 2. That is, in an optical disk where recording has been done by (1, 10) RLL modulation, channel bit $0s$ or $1s$ appear consecutively in the range of 2 to 11.

Figure 27:
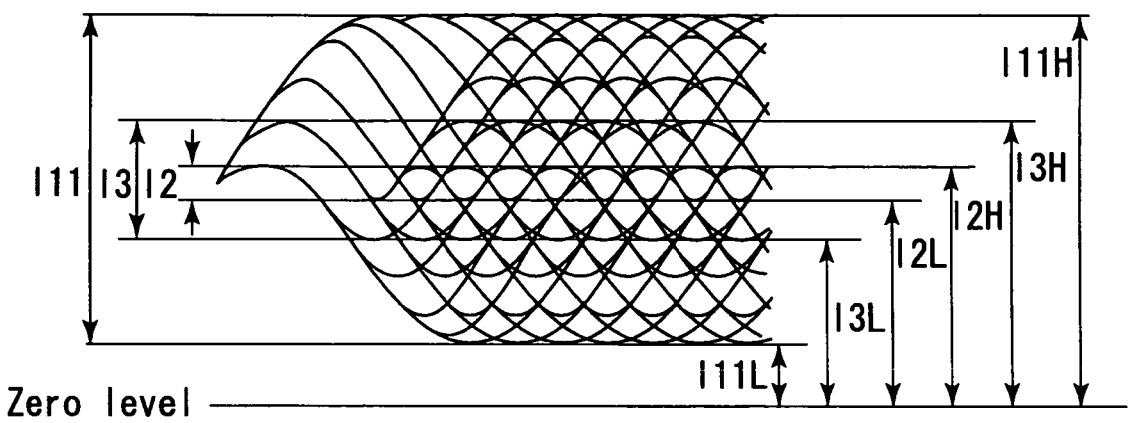
FIG. 27 shows waveforms of reproduced signals of the user data (2T to 11T patterns) recorded using the write strategy, that is, an eye-pattern.

FIG. 27 shows an eye-pattern of user data (random data) reproduced signals modulated by (1, 10) RLL modulation. In (1, 10) RLL modulation, the shortest code used in modulating the data is 2T (a pattern with only two consecutive channel bit $0s$ or $1s$) and the longest code is 11T (a pattern with 11 consecutive channel bit $0s$ or $1s$). Therefore, the signal with the smallest amplitude in the eye-pattern is a reproduced signal of a 2T pattern. Here, the highest level of the reproduced signal of a 2T pattern is defined as I2H (=IaH) and the lowest level is defined as I2L (=IaL). In addition, the amplitude of a 2T pattern is defined as I2 (=Ia). A signal with the next largest amplitude is a reproduced signal of a 3T pattern. I3H (=IbH), I3L (=IbL), and I3 (=Ib) are defined for the reproduced signal of a 3T pattern as they have been defined for a 2T pattern. On the other hand, a signal with the largest amplitude is a reproduced signal of a 11T pattern. I113H (=IcH), I11L (=IcL), and I11 (=Ic) are defined for the reproduced signal of a 11T pattern as they have been defined for a 2T pattern.

Here, the definition of two asymmetries, indexes of reproduced signals in the embodiment, will be explained. Asymmetry 4: AS2T11T', first asymmetry, is asymmetry in a 2T pattern for an envelope of the entire random data and is defined as follows:

$$AS2T11T' = \{(I11H+I11L)/2-(I2H+I2L)/2\}/I11\times100\% \quad (18)$$

Asymmetry 5: AS2T3T', second asymmetry, is asymmetry in a 3T pattern and a 2T pattern considered particularly liable to be misidentified and is defined as follows:

$$AS2T3T' = \{(I3H+I3L)/2-(I2H+I2L)/2\}/I11\times100\% \quad (19)$$

Here, (I13H+I13L)/2 is the center level of I13, (I3H+I3L)/2 is the center level of I3, and (I2H+I2L)/2 is the center level of I2.

Asymmetry 6: AS3T11T', third asymmetry, is asymmetry in a 3T pattern for the envelope and is defined as follows:

$$AS3T11T' = \{(I11H+I11L)/2-(I3H+I3L)/2\}/I11\times100\% \quad (20)$$

Asymmetry 4 defined in equation (18) corresponds to the above-described asymmetry 1. In contrast, asymmetry in equation (19) and asymmetry in equation (20) have been newly defined. Asymmetry 5 defined using equation (19) corresponds to the above-described asymmetry 2. The amplitude I11 of a 11T pattern, the longest code, is used as the denominator of the division, with the result that equation (19) equals equation (20) minus equation (18). Thus, calculating equation (20) and equation (18) gives the result of equation (19), which is more convenient. Instead of using 3T with a smaller amplitude as a reference, 11T with the largest amplitude is used as a reference, which increases the measuring accuracy. Equation (19) can be used to evaluate the shift in the signal level of each of the shortest code and the next shortest one which are particularly liable to be misidentified (in this case, a 2T code and a 3T code) among the codes used in the modulation law. The fact that asymmetry 5 is close to 0 means that the reproduced signals of a 2T code and a 3T code are in an ideal relation in the direction of amplitude. Thus, if asymmetry 5 is close to 0, identification errors decrease in an optical disk recorded with high density. The effect is particularly great in an optical disk using an identification method making use of information about the direction of amplitude, such as the PRML identification method. Moreover, in a medium in which a signal with asymmetry 5 close to 0 has been recorded, the signal is almost in the ideal state, which makes the medium highly interchangeable.

Asymmetry 6 defined in equation (20) corresponds to the above-described asymmetry 3 and can be used to evaluate the shift in the signal level of each of the longest code and the next shortest code (in this case, an 11T code and a 3T code) among the codes used in the modulation law. In an optical disk on which recording is done with high density, a signal of a 2T code, the densest code, has such a small amplitude that the amplitude is sometimes difficult to measure. In contrast, the amplitude of a signal of a 3T code is relatively larger than that of a signal of a 2T code, although it is sufficiently smaller than that of a signal of a 11T code. Thus, use of asymmetry 3 in evaluating a signal makes it relatively easy to produce almost the same effect as that of asymmetry 4.

Next, the result of the measurement representing the relationship between the asymmetries defined as described above and the error rate of the reproduced signal will be explained. An optical disk apparatus used for measurement is as shown in FIG. 4. The optical disk apparatus uses the PRML identification method in signal processing. An evaluation index measuring circuit 108 can measure asymmetry 4, asymmetry 5, asymmetry 6, and error rates.

Figure 28:
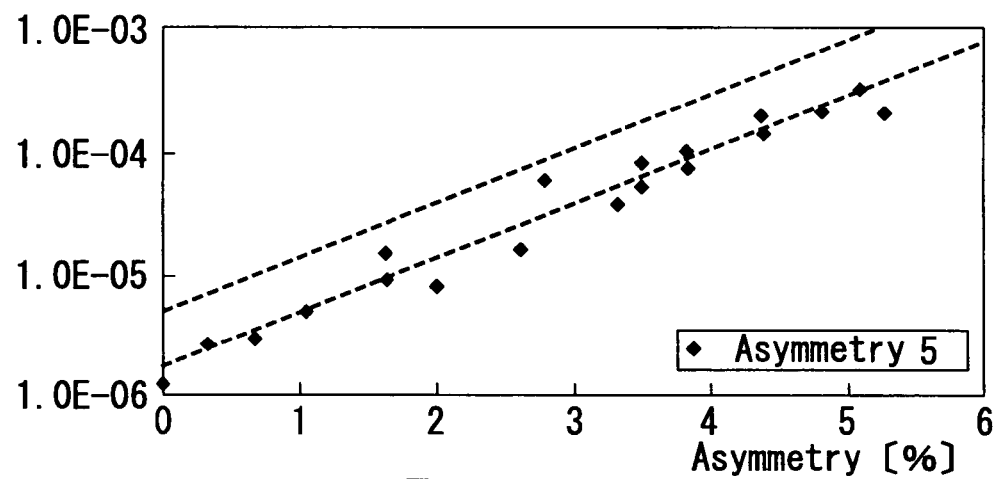
FIG. 28 shows the relationship between symmetry 5 and the error rate of a reproduced signal.
Figure 29:
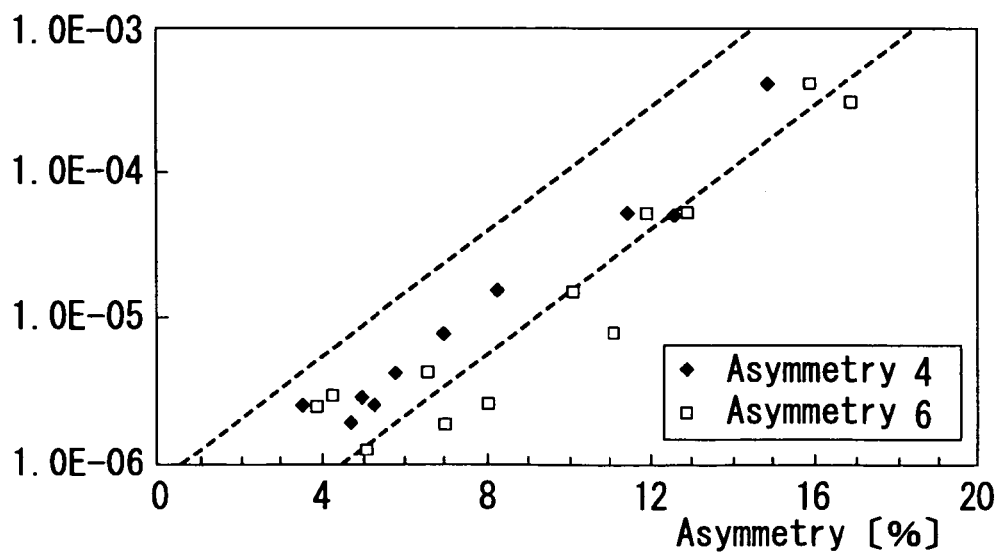
FIG. 29 shows the relationship between symmetry and the error rate of a reproduced signal and that between asymmetry 6 and the error rate.

FIG. 28 shows the relationship between asymmetry 5 and the error rate of the reproduced signal. FIG. 29 shows the relationship between asymmetry 4 and the error rate of the reproduced signal and that between asymmetry 6 and the error rate. Although the result of measuring each asymmetry actually takes not only positive values but also negative values, only positive values are shown in the figure.

From the results of FIGS. 28 and 29, the condition for keeping the interchangeability of the information recording medium is determined. Generally, the demodulation error rate of the information recording medium has to be equal to or less than $1.0\times10^{-4}$ to meet the condition for practically preventing a problem from arising. The reason for this is that, if the demodulation error rate is below $1.0\times10^{-4}$, it is possible to correct an error using an error correction code and read the correct information. Conversely, if the demodulation error rate is above $1.0\times10^{-4}$, uncorrectable errors increase, even when an error correction code is used, which makes it difficult to demodulate the user data accurately.

The comparison of FIG. 28 and FIG. 29 has shown that, since asymmetry 5 is more sensitive than asymmetry 4 and asymmetry 6, even if the value of asymmetry 5 is smaller than that of asymmetry 4 or asymmetry 6, it reaches $1.0\times$ $10^{-4}$. Therefore, it is necessary to always hold down asymmetry 5 to a smaller value than asymmetry 4 and asymmetry 6.

As described above, the comparison of asymmetry 4 and asymmetry 5 or of asymmetry 6 and asymmetry 5 makes it possible to evaluate the reproduced signal. That is, when asymmetry 5 is sufficiently smaller than asymmetry 4 or asymmetry 6, this means that the reproduced signal is close to an ideal state. Conversely, when asymmetry 5 is larger than asymmetry 4 or asymmetry 6, this means that the reproduced signal is far apart from the ideal state.

A criterion for determining that the reproduced signal is close to the ideal state and the medium has a high interchangeability can be derived from FIGS. 28 and 29. The criterion of the present invention is shown in equation (21) to equation (25).

$$-\text{Standard value } E < \text{Asymmetry 4} < \text{Standard value } F \quad (21)$$

$$-\text{Standard value } G < \text{Asymmetry 6} < \text{Standard value } H \quad (22)$$

$$-\text{Standard value } I < \text{Asymmetry 5} < \text{Standard value } J \quad (23)$$

$$\{\text{Standard value } F - (-\text{Standard value } E)\} \geq \{\text{Standard value } J - (-\text{Standard value } I)\} \quad (24)$$

$$\{\text{Standard value } H - (-\text{Standard value } G)\} \geq \{\text{Standard value } J - (-\text{Standard value } I)\} \quad (25)$$

In the present invention, the reproduced signal is evaluated on the basis of the following criterion: a range is provided for each of asymmetry 4, asymmetry 5, and asymmetry 6 in such a manner the range of asymmetry 5 is set smaller than that of each of asymmetry 4 and asymmetry 6. This makes the determination of the quality of the reproduced signal more accurate. An information recoding medium meeting the condition can be considered to realize a high interchangeability.

The result of FIG. 29 has shown that, to hold down the error rate of the reproduced signal to the specified value $1.0 \times 10^{-4}$ or less, it is necessary to limit standard values E, F, G, and H to 15% or less. Holding down asymmetry 4 and asymmetry 6 of the information recording medium to 15% or less makes it possible to obtain the stability of reproduction on average without any problem in practical use. Limiting standard values E, F, G, and H to 15% or less causes the error rate of the reproduced signal to be below $1.0 \times 10^{-4}$ on average, which makes it possible to provide an information recording medium without any problem in practical use. Furthermore, when standard values E, F, G, and H are held down to 10% or less, the error rate of the reproduced signal is below $1.0 \times 10^{-4}$ in almost all information recording mediums. Thus, holding down asymmetry 4 and asymmetry 6 in the information recording medium to 10% or less enables a high interchangeability and a reproduction stability to be secured with a sufficient margin. In addition, setting standard values E, F, G, and H to 10% or less makes it possible to provide a highly interchangeable information recording medium with a reproduction stability having a sufficient margin.

On the other hand, the result of FIG. 28 has shown that it is necessary to limit standard values I and J to 4% or less in order to hold down the error rate of the reproduced signal to the specified value $1.0 \times 10^{-4}$ or less. Holding down asymmetry 5 in the information recording medium to 4% or less makes it possible to obtain the stability of reproduction on average without any problem in practical use. Limiting standard values I and J to 4% or less causes the error rate of the reproduced signal to be below $1.0 \times 10^{-4}$ on average, which makes it possible to provide an information recording medium without any problem in practical use. Holding down standard values E, F, G, and H to 15% or less, the error rate of the reproduced signal is below $1.0 \times 10^{-4}$ on average, which makes it possible to provide an information recording medium without any problem in practical use. Furthermore, when standard values I and J are held down to 3% or less, the error rate of the reproduced signal is below $1.0 \times 10^{-4}$ in almost all information recording mediums. Thus, holding down asymmetry 5 in the information recording medium to 3% or less enables a high interchangeability and a reproduction stability to be secured with a sufficient margin. In addition, setting standard values I and J to 3% or less makes it possible to provide a highly interchangeable information recording medium with a reproduction stability having a sufficient margin.

Figure 30:
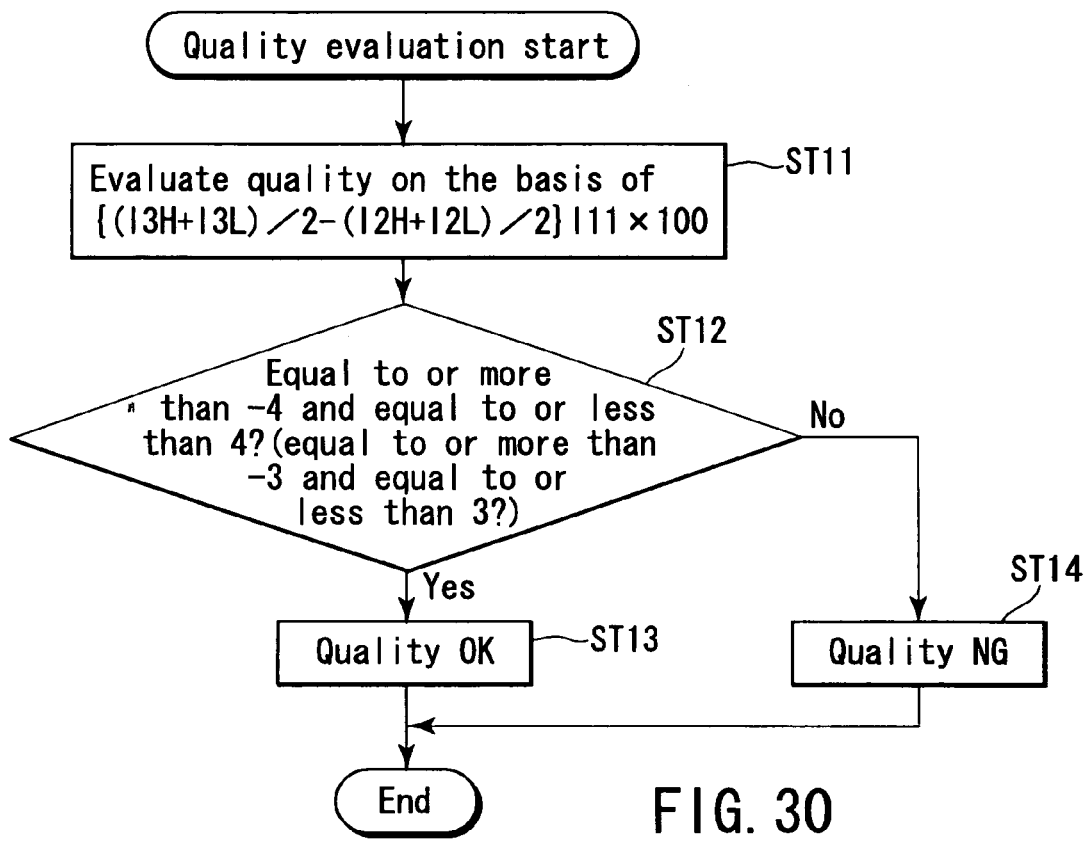
FIG. 30 is a flowchart to help explain a first example of the reproduced signal evaluation method.
Figure 31:
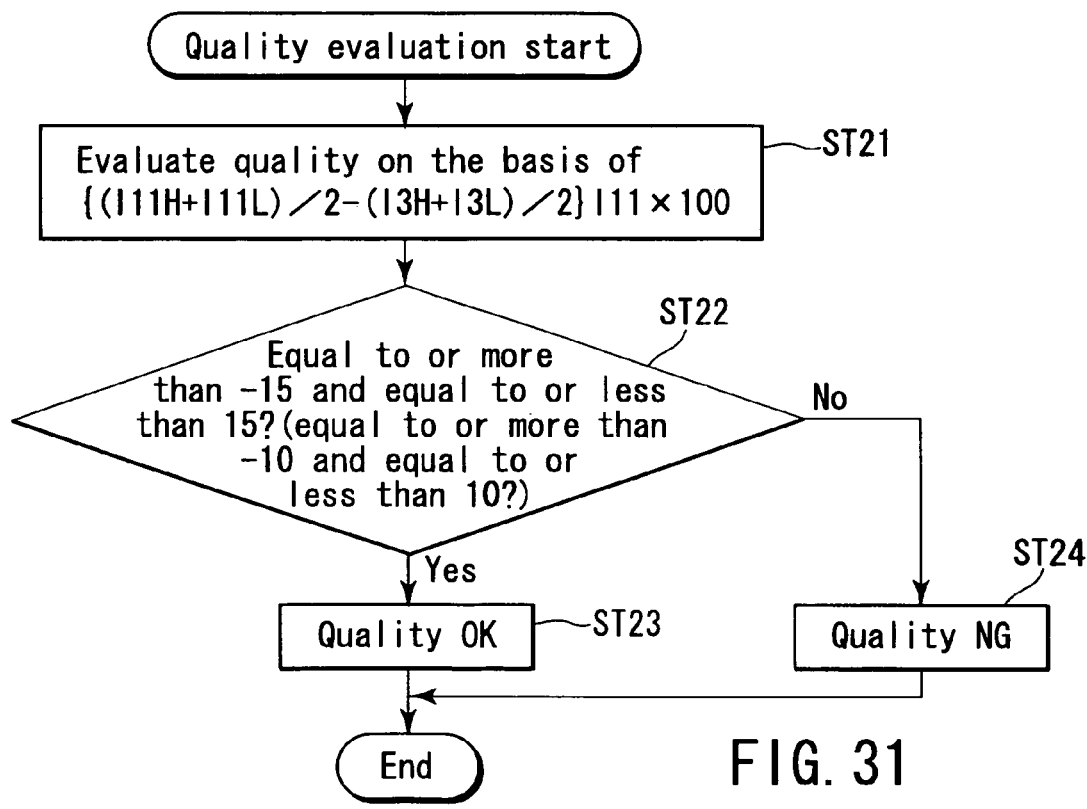
FIG. 31 is a flowchart to help explain a second example of the reproduced signal evaluation method.

FIGS. 30 and 31 are flowcharts to help explain the above-described evaluation method. Specifically, as shown in FIG. 30, for example, the quality is evaluated on the basis of $\{(I3H+I3L)/2-(I2H+I2L)/2\}/I11 \times 100$ (ST11). At this time, if the value of $\{(I3H+I3L)/2-(I2H+I2L)/2\}/I11 \times 100$ is equal to or more than $-4$ and equal to or less than 4 (or equal to or more than $-3$ and equal to or less than 3) (YES in ST12), it is determined that the quality is OK (ST13). Conversely, if the value is not equal to or more than $-4$ and equal to or less than 4 (NO in ST12), it is determined that the quality is NG (ST14).

Alternatively, as shown in FIG. 31, the quality is evaluated on the basis of $\{(I11H+I11L)/2-(I3H+I3L)/2\}/I11 \times 100$ (ST21). At this time, the value of $\{(I11H+I11L)/2-(I3H+I3L)/2\}/I11 \times 100$ is equal to or more than $-15$ and equal to or less than 15 (or equal to or more than $-10$ and equal to or less than 10) (YES in ST22), it is determined that the quality is OK (ST23). Conversely, if the value is not equal to or more than $-15$ and equal to or less than 15 (NO in ST22), it is determined that the quality is NG (ST24).

Figure 32:
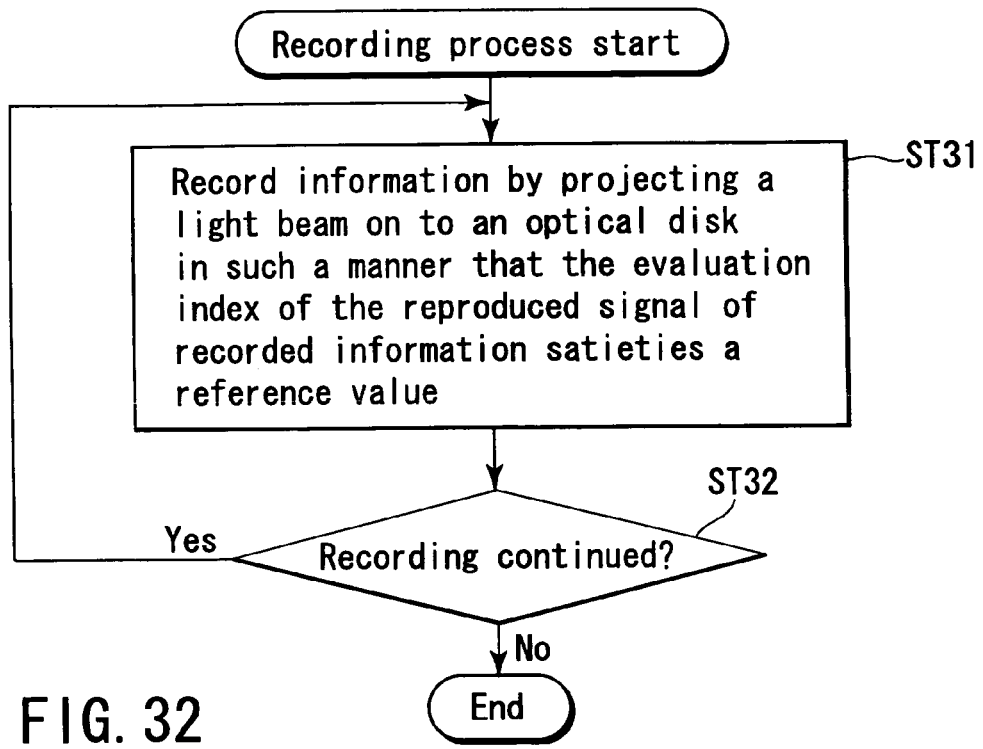
FIG. 32 is a flowchart for an information recording process of recording information in such a manner that a specific reference value is satisfied when an evaluation is made by the reproduced signal evaluation method.

FIG. 32 shows an information recording process performed on an optical disk (shown in FIG. 26) whose quality is determined to be OK by the evaluation method shown in FIG. 30 or FIG. 31. The optical disk apparatus of FIG. 4 records information onto the optical disk. Specifically, the recording waveform generator circuit 41, LD driver 44, and optical pickup 46 record information onto the optical disk. As shown in FIG. 32, the information is recorded by projecting a light beam in such a manner that the value of $\{(I3H+I3L)/2-(I2H+I2L)/2\}/I11 \times 100$ is equal to or more than $-4$ and equal to or less than 4 (or equal to or more than $-3$ and equal to or less than 3) (ST31). Alternatively, the information is recorded by projecting a light beam in such a manner that the value of $\{(I11H+I11L)/2-(I3H+I3L)/2\}/I11 \times 100$ is equal to or more than $-15$ and equal to or less than 15 (or equal to or more than $-10$ and equal to or less than 10) (ST31). The recording process is continued until the recording of the desired information has been completed (ST32).

Figure 33:
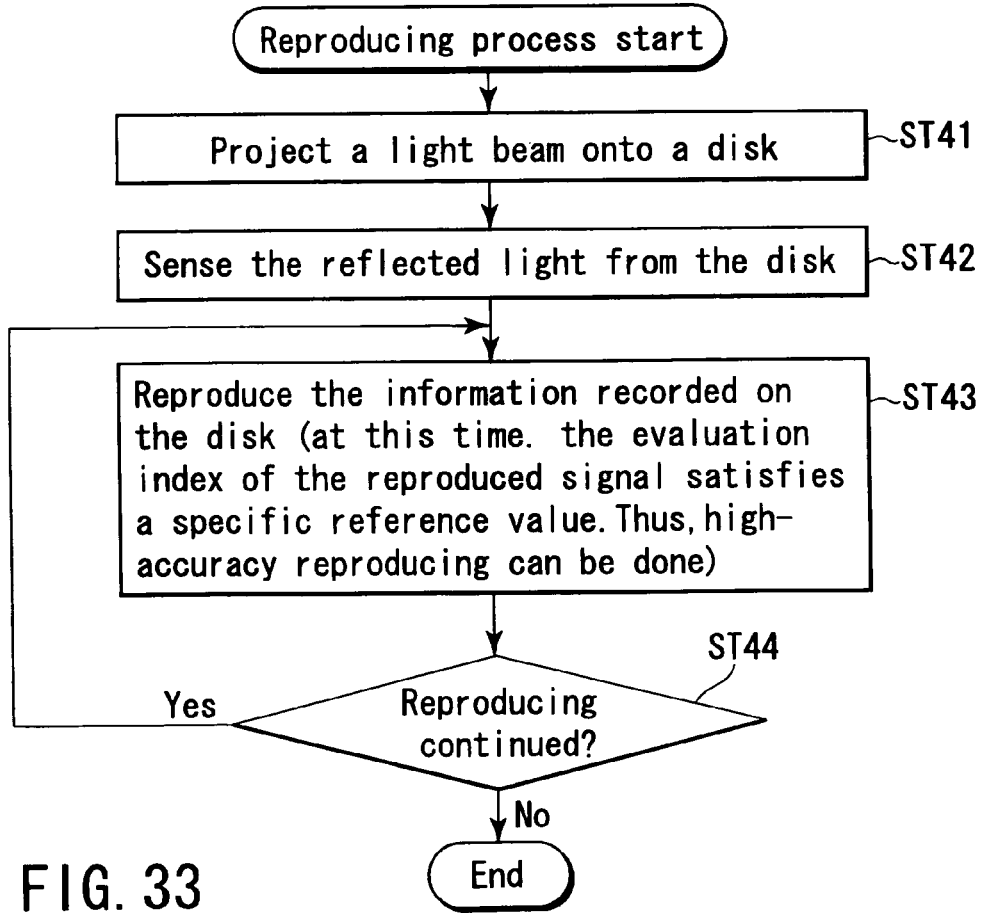
FIG. 33 is a flowchart to help explain an information reproducing process of reproducing the information from an information recording medium in which information has been recorded in such a manner that a specific reference value is satisfied when an evaluation is made by the reproduced signal evaluation method.

FIG. 33 shows the process of reproducing the information from the optical disk (shown in FIG. 26) whose quality is determined to be OK by the evaluation method shown in FIG. 30 or FIG. 31. Specifically, the process of reproducing the information from the optical disk on which the information has been recorded in the information recording process of FIG. 32. The optical disk apparatus of FIG. 4 reproduces the information from the optical disk. Specifically, the LD driver 44, optical pickup 46, photodetector (PD) 50, preamplifier 51, and signal processing circuit 52 reproduce the information from the optical pickup. As shown in FIG. 33, a light beam is projected onto the optical disk (ST41). The reflected light from the optical disk is sensed (ST42). On the basis of the reflected light sense signal, the information recorded on the optical disk is reproduced (ST43). At this time, the evaluation index of the reproduced signal satisfies a specific reference value. Specifically, the value of $\{(I3H+I3L)/2-(I2H+I2L)/2\}/I11\times100$ is equal to or more than −4 and equal to or less than 4 (or equal to or more than −3 and equal to or less than 3). Alternatively, the value of $\{(I11H+I11L)/2-(I3H+I3L)/2\}/I11\times100$ is equal to or more than −15 and equal to or less than 15 (or equal to or more than −10 and equal to or less than 10). Consequently, high-accuracy reproduction can be made.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information recording medium comprising a track in which information composed of a plurality of codes different in length is recorded,
   wherein the next shortest code after the shortest code included in the plurality of codes if formed on the track so that the result of evaluating a reproduced signal based on the reproduced signal of the next shortest code satisfies a specific evaluation level, wherein
   if the maximum value of the reproduced signal of the shortest code reproduced from the information recording medium is IaH and the minimum value of the reproduced signal is IaL,
   the maximum value of the reproduced signal of the next shortest code after the shortest code reproduced from the information recording medium is IbH and the minimum value of the reproduced signal is IbL, and
   the amplitude of the reproduced signal of the longest code or a code three times or more as long as the shortest code reproduced from the information recording medium is Ic, the maximum value of the reproduced signal is IcH, and the minimum value of the reproduced signal is IcL,
   the absolute value of $\{(IbH+IbL)/2-(IaH+IaL)/2\}/Ic\times100$ is smaller than the absolute value of $\{(IcH+IcL)/2-(IbH+IbL)/2\}/Ic\times100$.

2. An information recording apparatus for reproducing information from an information recording medium in which information composed of a plurality of codes different in length is recorded and in which, if the maximum value of the reproduced signal of the shortest code reproduced from the information recording medium is IaH and the minimum value of the reproduced signal is IaL, the maximum value of the reproduced signal of the next shortest code after the shortest code reproduced from the information recording medium is IbH and the minimum value of the reproduced signal is IbL, and the amplitude of the reproduced signal of the longest code or a code three times or more as long as the shortest code reproduced from the information recording medium is Ic, the maximum value of the reproduced signal is IcH, and the minimum value of the reproduced signal is IcL, the absolute value of $\{(IbH+IbL)/2-(IaH+IaL)/2\}/Ic\times100$ is smaller than the absolute value of $\{(IcH+IcL)/2-(IbH+IbL)/2\}/Ic\times100$, the information reproducing apparatus comprising:
   sensing unit configured to sense the reflected light of a light beam projected onto the information recording medium; and
   reproducing unit configured to reproduce information composed of a plurality of code differing in length on the basis of the reflected light sensed by the sensing unit.

3. An information reproducing method of reproducing information from an information recording medium in which information composed of a plurality of codes different in length is recorded and in which, if the maximum value of the reproduced signal of the shortest code reproduced from the information recording medium is IaH and the minimum value of the reproduced signal is IaL, the maximum value of the reproduced signal of the next shortest code after the shortest code reproduced from the information recording medium is IbH and the minimum value of the reproduced signal is IbL, and the amplitude of the reproduced signal of the longest code or a code three times or more as long as the shortest code reproduced from the information recording medium is Ic, the maximum value of the reproduced signal is IcH, and the minimum value of the reproduced signal is IcL, the absolute value of $\{(IbH+IbL)/2-(IaH+IaL)/2\}/Ic\times100$ is smaller than the absolute value of $\{(IcH+IcL)/2-(IbH+IbL)/2\}/Ic\times100$, the information reproducing method comprising:
   sensing the reflected light of a light beam projected onto the information recording medium; and
   reproducing information composed of a plurality of code differing in length on the basis of the sensed reflected light.

4. An information recording method of recording information into an information recording medium, comprising recording information by projecting a light beam in such a manner that, as a result of recording information composed of a plurality of codes different in length into the information recording medium, if the maximum value of the reproduced signal of the shortest code reproduced from the information recording medium is IaH and the minimum value of the reproduced signal is IaL, the maximum value of the reproduced signal of the next shortest code after the shortest code reproduced from the information recording medium is IbH and the minimum value of the reproduced signal is IbL, and the amplitude of the reproduced signal of the longest code or a code three times or more as long as the shortest code reproduced from the information recording medium is Ic, the maximum value of the reproduced signal is IcH, and the minimum value of the reproduced signal is IcL, the absolute value of $\{(IbH+IbL)/2-(IaH+IaL)/2\}/Ic\times100$ is smaller than the absolute value of $\{(IcH\times IcL)/2-(IbH+IbL)/2\}/Ic\times100$.

* * * * *